United States Patent [19]
Takeuchi et al.

[11] Patent Number: 5,406,598
[45] Date of Patent: Apr. 11, 1995

[54] SYSTEM FOR MONITORING POWER OF NUCLEAR REACTOR

[75] Inventors: Yutaka Takeuchi, Tochigi; Hitoshi Uematsu, Yokohama; Yukio Takigawa, Kawasaki, all of Japan

[73] Assignee: Kabushiki Kaisha Toshiba, Kawasaki, Japan

[21] Appl. No.: 124,751

[22] Filed: Sep. 22, 1993

[30] Foreign Application Priority Data

Sep. 22, 1992 [JP] Japan ................................. 4-253107
Aug. 24, 1993 [JP] Japan ................................. 5-209717

[51] Int. Cl.⁶ ............................................ G21C 17/00
[52] U.S. Cl. .................................... 376/254; 376/255; 376/241
[58] Field of Search ............... 376/254, 277, 249, 241, 376/255; 976/DIG. 238

[56] References Cited

U.S. PATENT DOCUMENTS

| | | | |
|---|---|---|---|
| 4,330,367 | 5/1982 | Musick | 376/245 |
| 4,711,753 | 12/1987 | Impink, Jr. et al. | 376/216 |
| 4,770,843 | 9/1988 | Taleyarkhan | 376/216 |
| 4,804,514 | 2/1989 | Bartko et al. | 376/154 |
| 5,024,801 | 6/1991 | Impink, Jr. et al. | 376/217 |
| 5,141,710 | 8/1992 | Stirn et al. | 376/254 |
| 5,225,149 | 7/1993 | Banda | 376/255 |

OTHER PUBLICATIONS

Statistical Methods of Measuring Absoluute Reactor Power. By Mogil'ner Translated From Atomnaya E'nergiya, vol. 20, No. 2, pp. (117-123), Feb. 1966.

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

A system for monitoring power, particularly a power distribution, of a nuclear reactor includes a plurality of neutron flux measuring units disposed in a core of the nuclear reactor for measuring neutron flux in the core and generating neutron flux signals. A unit, generally constructed by a process computer, for calculating a neutron flux distribution in the core in response to the neutron flux detection signals from the neutron flux measuring units, is provided. A unit for calculating a higher mode of the neutron flux distribution in accordance with results of calculations performed by the neutron flux distribution calculating unit, is provided. A filter calculating unit is provided for obtaining a filter for extracting characteristics of change of the neutron flux detection signal in response to the neutron flux detection signal and an input/output unit for transmitting the neutron flux detection signal filtered by the filter obtained by the filter calculating unit.

15 Claims, 21 Drawing Sheets

SYSTEM FOR MONITORING POWER OF NUCLEAR REACTOR

BACKGROUND OF THE INVENTION

Field of the Invention

The present invention relates to a system for monitoring power of a nuclear reactor and a power distribution in a nuclear reactor core especially for monitoring the stability of the state of the reactor core in accordance with a neutron flux distribution in the reactor core.

Description of the Related Arts

A boiling water reactor (hereinafter called a "BWR") is equipped with a nuclear instrumentation system provided with a plurality of neutron flux detection devices which are arranged in the core to monitor the power distribution of an operating power level. The nuclear instrumentation is called a "local power regional monitor (LPRM)", which has four neutron flux detectors disposed along the vertical direction in the core. For example, a 1100 MEe class BWR has, in the reactor core thereof, $43 \times 4 = 172$ (channels) neutron detectors.

Signals (LPRM signals) from each neutron flux detector are, in each group of about 20 signals, averaged into an average power range monitor (APRM). For example, a 1100 MWe class BWR has 8 channels of the average power range monitors, and therefore, APRM signals from 8 channels are monitored. All of the APRM signals and the LPRM signals are analog signals.

In the current BWR, the APRM signals are monitored to cause the operation of the nuclear reactor to be performed stably and safely.

A nuclear reactor core condition is extremely stable at a rated operational point. However, in the case of flow down to a natural circulation state due to a trip of the recirculation pump, the reactor power decreases along with the flow down. However, since the reactor power is reduced to only about 50% as contrasted with the fact that the reactor flow decreases to about 30% of the normal rated flow, the core condition becomes unstable.

In the unstable condition, there is a possibility that the reactor power oscillates with a cycle of about 2 to 3 seconds.

Although the oscillations of the reactor power dumps quickly in the stable condition, the oscillations of the reactor power can be sustained in the unstable condition.

In order to maintain the fuel integrity during the reactor power oscillation, the following counter-measures have been taken at present.

One of the countermeasures is arranged in such a manner that APRM signals, each of which has been obtained by averaging the LPRM signal supplied from the neutron flux detectors, are monitored if oscillations have been generated in the reactor power and all control rods are inserted (made scram) if the value of the APRM signal is larger than a predetermined limit value so that the operation of the nuclear reactor is shut down. Although the insertion of the control rod is a very effective means in terms of the safety operation of the nuclear reactor, it has been considered that the foregoing method is not the best method in terms of efficiently operating the nuclear reactor.

Another method is a method in which the nuclear reactor is stabilized while preventing the oscillation of the reactor power even if the unstable reactor state has been realized. The foregoing method is arranged in such a manner that an upper limit of the stable nuclear reactor power in a low flow state has been evaluated, and that a portion of the control rods is selectively inserted as to make the reactor power smaller than the upper limit. The method in which a portion of the control rods is selectively inserted is called "selected rod insertion" (hereinafter called an "SRI"), the foregoing method being a safety and efficient operation method because the operation of the nuclear reactor can be stabilized while preventing the operation shutdown of the nuclear reactor.

Since the SRI is arranged so that the control rods mounted on the reactor core are selectively used, it is necessary that the control rods for use must be previously determined. The selection of the control rod is so performed that the control rods are selected so as to exclude the unstable region and the reactor power distribution is sufficiently flattened.

Since the radial directional power distribution in the nuclear reactor is high in the center of the reactor core and low in its periphery, control rods adjacent to the central portion are employed and inserted as the selected control rods in order to reduce the reactor power sufficiently. The positions of the control rods for use at the time of the execution of the SRI are previously registered in a process control computer disposed in a site.

The SRI realizes a flat reactor power distribution in the reactor core of the nuclear reactor. Although the uniform or flattened reactor power distribution avoids the core-wide power oscillations, it undesirably generates oscillations of the power in a partial region of the core or enhances the oscillations.

The power oscillations in the partial region of the core are called "regional oscillations". The reason why the regional oscillations are generated will now be described.

It has been generally known that the neutron flux distribution in the core of the nuclear reactor meets the following equation:

[Numerical Formula 1]

$$(L+A)\phi 0 = 1/\lambda \cdot F \cdot \phi 0 \tag{1}$$

where $\phi 0$: neutron flux
L: neutron leakage cross section
A: neutron absorption cross section
F: neutron fission cross section
$\lambda 0$: critical eigenvalue Usually, the neutron flux $\phi 0$ meeting Equation (1) is called a neutron flux in the fundamental mode, while critical eigenvalue $\lambda 0$ is called an "eigenvalue" in the fundamental mode.

Actually, neutron special harmonics exist which satisfy the relationship expressed by Equation (1) are present as expressed by the following formula:

[Numerical Formula 2]

$$(L+A)\phi n = 1/\lambda 0 \cdot F \cdot \phi n (n=0,1,2 \ldots) \tag{2}$$

where n: harmonics order
$\phi n$: n-th harmonics
$\lambda n$: eigenvalue of n-th harmonics As indicated below, these neutron fluxes are in the following orthogonal relationship with each other.

[Numerical Formula 2']

$$\int_{wholecore} \phi_m \cdot \phi_n \, dV = \begin{matrix} 1.0 \ (m = n) \\ 0.0 \ (m \neq n) \end{matrix} \quad (2')$$

Here, it is assumed that the integration is done over the entire reactor core and the harmonics are normalized.

Among the neutron fluxes $\Phi_n$ expressed by Equation (2) only the neutron flux in the fundamental mode (corresponding to n=0) is always present in the core, while the residual modes (corresponding to n=1, 2, 3, ..., usually called "higher modes") dump instantaneously, although they are present temporarily if a certain disturbance, such as insertion of a control rod, takes place in the reactor core. The degree of the "short life" can be known from the subcriticality of the neutron higher harmonics.

The subcriticality can be expressed by the difference $\Delta n$ between the critical eigenvalue $\lambda 0$ ($\lambda 0$ is necessarily 1.0) in the fundamental mode and the harmonics eigenvalue $\lambda n$ in the higher mode.

[Numerical Formula 3]

$$\Delta n = \lambda 0 - \lambda n (n=0, 1, 2, \ldots) \quad (3)$$

Since the order of the mode is given in proportion to the harmonics eigenvalue, the relationship expressed by Equation (4) is held.

[Numerical Formula 4]

$$0.0 = \Delta 0 < \Delta 1 < \Delta 2 < \ldots \quad (4)$$

Further, the neutron flux $\Phi$ is expressed by the following equation if the core of the nuclear reactor is in a transient state:

[Numerical Formula 5]

$$\phi = Sum \ An \cdot \phi_n (n=0,1,2,\ldots) \quad (5)$$

where $\phi$: neutron flux at the time of transient
An: magnitude of n-th harmonics The harmonics magnitude can be obtained in the following equation (5') using the inter-mode orthogonal condition given by the equation (2').

[Numerical Formula 5']

$$An = \int_{wholecore} \phi \, \phi_n \, dV \quad (5')$$

In Equation (5), magnitude An of the n-th harmonics shows the degree of contribution of each harmonics mode to the neutron flux, the magnitude An being a function of the subcriticality and time. That is, the neutron flux in the reactor core in the transient state is expressed by the superposition of the respective modes while using the magnitude An of the mode as a weight at this time. Therefore, even if the distribution form of the higher mode locally takes a negative value, the neutron flux distribution in the reactor core does not actually take a negative value.

If the subcriticality of the higher mode is large, the magnitude of the mode decreases as time passes, resulting in Equation (5) to be as follows as described above in a stationary state after the transient state has been realized:

[Numerical Formula 6]

$$\Phi = \Phi 0 \quad (6)$$

However, if the subcriticality in the higher mode is small for some reason, the dumping of the first mode, the subcriticality of which is the smallest among the higher modes is particularly slow, resulting in that the neutron flux $\Phi$ in the reactor core is temporarily expressed by the sum of the fundamental mode and the first mode.

[Numerical Formula 7]

$$\Phi = A0 \ \phi 0 + A1 \ \Phi 1 \quad (7)$$

If a certain disturbance exciting the first mode of the neutron flux takes place in the foregoing core state of the nuclear reactor, the first mode is changed in accordance with the fundamental mode, and therefore, a possibility arises that oscillations are excited if the core is unstable. Even if the oscillation has been excited, the reactor power does not oscillate in the whole core region because the fundamental mode is not changed. However, the power distribution is oscillated in the form of the distribution of the first mode.

Although the subcriticality is changed depending upon, for example, the size of the reactor core or the fuel instrumentation pattern, it considerably depends upon the power distribution of the reactor core. FIGS. 17A, 17B, FIGS. 18A and 18B respectively show the radial neutron flux distribution in the fundamental mode and the first mode in two different states of a 1,100,000 kwe class nuclear reactor.

The axis of ordinate of each of FIGS. 17 and 18 indicates the neutron flux distribution (unit is arbitrary), while two axes of abscissa indicate the positions of the fuel assembly. The states of the reactor core shown in FIGS. 17A and 17B are characterized in that the fundamental mode of the neutron flux distribution is sufficiently flattened but the subcriticality of the first mode of the neutron flux is small as compared with the states shown in FIGS. 18A and 18B.

As can be understood from the foregoing examples, the subcriticality of the first mode of the neutron flux distribution in the state of the reactor core in which the power distribution is flat. Therefore, it will be said that regional oscillations can easily be excited.

As described above, the regional oscillations can easily be excited if the subcriticality of the first harmonics is small. Therefore, by monitoring the subcriticality, the possibility of the onset of the regional oscillations can be estimated. Further, a certain countermeasure for preventing the onset of the regional oscillations must be taken.

However, in the operation of the reactor, a method for evaluating the subcriticality of the first mode by solving the Equations (2) and (3) to the direct first mode involves difficulty, thus being not practical.

Since the subcriticality of the first mode considerably depends upon the core condition even if the nuclear reactor and the operational cycle are specified, it must always be reevaluated to be adaptable to the change of the state of the reactor core. However, solving Equation (2) for the first mode encounters a problem that the calculations take a long time because the reactor power is converged slowly as contrasted with the fundamental mode.

The nuclear reactor is operated in such a manner that the APRM signal obtained by averaging the LPRM signals is used to monitor the distribution of the neutron fluxes to avoid the operation in an unstable core condition. Although the APRM signal can detect the core-wide power change because the APRM signal is obtained by equally averaging the LPRM signals, in the use of the APRM signal, there is a possibility of making difficult the detection of the reactor power distribution, if the core of the nuclear reactor is locally changed or if the same is changed while spatially having a phase difference because the quantity of the change is set off due to averaging of the LPRM signals.

As an example of the local change in the reactor core, a so-called "channel oscillations" can be considered in which a thermal-hydraulically severe fuel assembly generates an oscillation phenomenon called "density wave oscillations". Although the oscillation phenomenon can be diffused by the oscillations of the neutron fluxes, there is a possibility that the change is limited in only a relatively narrow range.

As an example of the change taking place while having the spatial phase difference, there is an oscillation phenomenon called a regional oscillation occurring at symmetrical positions in the core while having a phase difference of 180°. The foregoing oscillation phenomenon has been observed in some overseas plants. For example, a regional oscillation observed in CAORSO plant in Italy showed the maximum oscillation of APRM of 10% or less. On the other hand, oscillations reaching to 60% were observed in the LPRM that shows the largest oscillation. The reason for this is considered that the fact, that oscillations symmetrically are generated at a phase difference of 180° in the core, causes the maximum value and the minimum value of the LPRM to be simultaneously averaged, and therefore, cancelling takes place during this.

When the stability of the reactor core is monitored, the decay ratio, the period of the oscillation and the amplitude denoting the stability are calculated from the APRM signal to estimate usually the stability of the state of the core. However, there is a possibility that the stability of the reactor core cannot accurately be detected by simply monitoring the APRM signal.

SUMMARY OF THE INVENTION

The present invention has been directed to overcome the foregoing problems encountered in the prior art, and therefore, an object of the present invention is to provide a system for monitoring a nuclear reactor which detects the change of the power of the reactor core by using a conventional LPRM signal or the like and which is capable of improving the safety of the reactor core and the availability of a nuclear reactor.

Another object of the present invention is to provide a system for monitoring a nuclear reactor which provides a filter for peculiarly extracting the oscillation mode of the neutron flux distribution and which is able to monitor and discriminate the stability of the reactor core in accordance with a signal processed by the filter.

Another object of the present invention is to provide a system for monitoring a nuclear reactor capable of quickly discriminating a possibility of generation of the regional oscillations and enabling the nuclear reactor to be operated safely and efficiently.

Another object of the present invention is to provide a system for monitoring a nuclear reactor which quickly discriminates the possibility of the regional oscillations occurring at the time of selected rod insertion and that enables the nuclear reactor to be operated safely and efficiently.

These and other objects can be achieved according to the present invention by providing, in one aspect, a system for monitoring power of a nuclear reactor comprising:
- a plurality of neutron flux measuring means disposed in a core of the nuclear reactor for measuring neutron flux in the core and generating neutron flux signals;
- means for calculating a neutron flux distribution in the core in response to the neutron flux detection signals from said neutron flux measuring means;
- means for calculating a higher mode of the neutron flux distribution in accordance with results of calculations performed by the neutron flux distribution calculating means;
- a filter calculating means for obtaining a filter for extracting characteristics of change of the neutron flux detection signal in response to the neutron flux detection signal; and
- an input/output means for transmitting the neutron flux detection signal filtered by the filter obtained by the filter calculating means.

In a preferred mode, the filter calculating means is operatively connected at one side to the neutron flux measuring means through a data sampler and at another side to the higher mode calculating means. Then, the filter calculating means obtains a filter reflecting a state of the core realized due to change of an operational state in accordance with the higher mode of the neutron flux distribution calculated by the higher mode calculating means. Thus, a filter is obtained in accordance with differences in amplitudes and phases between signals occurring due to change of the neutron flux detection signal measured actually.

The system further comprises a stability monitoring means connected to an output side of the filter calculating means and the stability monitoring means has a structure for evaluating a core stability index in response to a power signal filtered by the filter calculating means to monitor the stability of the state of the core.

The neutron flux distribution calculating means is constituted by a process control computing means which is provided in association with the higher mode calculating means. The process control computing means includes the higher mode calculating means. A power distribution monitoring means connected at input side to the process control computing means and at output side to a display means.

In another aspect, there is also provided a system for monitoring power of a nuclear reactor comprising:
- a plurality of neutron flux measuring means disposed in a core of the nuclear reactor for measuring neutron flux in the core and generating neutron flux signals;
- means for calculating the fundamental mode distribution of the neutron flux in response to the neutron flux detection signal measured by the neutron flux measuring means;
- a subcriticality evaluating means for estimating a subcriticality of a state of the core in accordance with the neutron flux distribution in the calculated fundamental mode; and
- an input/output means for transmitting a result of an evaluation made by the subcriticality evaluation means.

In a preferred mode, the apparatus further comprises a higher mode calculating means for calculating a higher mode of the neutron flux distribution in accordance with results of calculations performed by the neutron flux distribution calculating means and a filter calculating means for obtaining a filter for extracting characteristics of change of the neutron flux detection signal in accordance with the neutron flux detection signal and the results of calculations performed by the filter calculating means is transmitted to the input/output means.

The neutron flux distribution calculating means is constructed by a process control computing means connected at input side to the neutron flux measuring means through a data sampler and at output side to the subcriticality evaluation means. The process control computing means is further connected at output side to the high mode calculating means. The system further comprises a filter calculating means operatively connected to the neutron flux measuring means for obtaining a filter for extracting characteristics of change of the neutron flux detection signal in response to the neutron flux detection signal and a stability monitoring means connected to an output side of said filter calculating means and the stability monitoring means has a structure for evaluating a core stability index in response to a power signal filtered by the filter calculating means to monitor the stability of the state of the core.

In a further aspect, there is also provided a system for monitoring power of a nuclear reactor comprising:
 a core present state data measuring means for measuring an operational state of a core of the nuclear reactor and generating a core operational state signal;
 means for calculating a neutron flux distribution in a basic mode in response to the core operational state signal from the core present state data measuring means;
 means for calculating a higher mode of the neutron flux in a state of the core realized when insertion of a selected rod is executed in accordance with the calculated neutron flux distribution and discriminating whether or not a subcriticality of the higher mode is smaller than a predetermined limit value; and
 an input/output means for transmitting results of calculations performed by the higher mode calculating means.

In a still further aspect, there is also provided a system for monitoring power of a nuclear reactor comprising:
 a plurality of neutron flux measuring means disposed in a core of the reactor for measuring neutron flux in the core and generating a signal representing a local power range monitor enumerated data from the neutron flux measuring means;
 means for calculating neutron flux distribution in response to the signal from the neutron flux measuring means;
 a higher mode calculating means for calculating neutron higher modes in accordance with the calculation results of the neutron flux distribution calculating means; and
 an input/output means for outputting calculation results from the neutron flux distribution calculating means and the higher mode calculating means.

In a preferred mode, the higher mode calculating means is provided with a magnitude variation calculating means for calculating a variation in magnitude in each mode on the basis of the higher mode modes and the local power range monitor enumerated data. The neutron flux distribution calculating means is constructed by a process control computing means operatively connected at input side to the neutron flux measuring means through a data sampler and at output side to the higher mode calculating means.

The system for monitoring power of a nuclear reactor according to one aspect of the present invention comprises the filter calculating means in addition to the conventional APRM signal obtained by averaging the analog signals to monitor the reactor power and the reactor power distribution by using each neutron flux detection signal. The filter calculating means obtains the filter corresponding to the state of the reactor core or obtains the same corresponding to the change characteristics of the signal in response to each neutron flux detection signal, the filter for extracting the characteristics of the signal change being used to fill each neutron flux detection signal so that the decay ratio, the period of the oscillations and the amplitude showing the stability of the state of the reactor core and the like are obtained at the time of monitoring the stability of the reactor core.

The calculation of the filter performed by a filter calculating means by a calculating step for periodically calculating the filter in accordance with the change of the spatial distribution characteristics of the reactor power whenever the operational state is changed and by a sequential calculating step for calculating the same in accordance with the amplitude difference or the phase difference between the signals. The former is calculated in accordance with information from the neutron flux distribution calculating means, which is a process control computer, i.e. process computer, and that from a higher mode calculating means, while the latter is calculated in response to the neutron flux detection signal, which is an actually measured signal that is sequentially detected.

The power signal filtered by the filter calculated by the filter calculating means is received by the stability monitoring means to obtain sequentially the decay ratio and the oscillation period showing the stability of the core and the amplitude showing the power change. The obtained values are used to monitor the stability of the reactor core to be evaluated in an on-line manner.

The system for monitoring power of a nuclear reactor is able to accurately detect the power change phenomenon, and, in particular, the power oscillation phenomenon due to the regional oscillations, which has been difficult to be detected by using the conventional APRM signal. Therefore, the apparatus is able to contribute to improve the stability of the core and the availability of the nuclear reactor.

The system for monitoring power of a nuclear reactor according to another aspect of the present invention is able to discriminate the possibility of the generation of the regional oscillations from the subcriticality of the state of the core obtained by the subcriticality evaluation means, to estimate the easiness of occurring the regional oscillations, to monitor the stability of the state of the core, to control the core while preventing the generation of the regional oscillations and to operate the nuclear reactor safely and efficiently.

The system for monitoring power of a nuclear reactor according to a further aspect of the present invention calculates the higher mode of the neutron flux in a state of the reactor core when the selected rod insertion (SRI) is executed, and discriminates whether or not its subcriticality is smaller than a predetermined limit value. Therefore, the possibility of the generation of the regional oscillations at the time of the execution of the SRI can quickly be discriminated. Therefore, the nuclear reactor can safely and efficiently be operated.

In a still further aspect, a neutron flux distribution is calculated in accordance with the local power range monitor (LPRM) enumerated data and the higher modes of the neutron flux are calculated in accordance with the calculation results. The variation in strength of each mode is calculated on the basis of the higher modes and the LPRM enumerated data. The calculation results are outputted and reported to the operator. Thus, unlike the conventional method using the APRM value, the method of the present invention makes it possible to quickly detect any regional oscillation.

The nature and further features of the present invention will be made further clear from the following descriptions made with reference to the accompanying drawings.

DESCRIPTION OF THE PREFERRED EMBODIMENTS

Embodiments of the apparatus for monitoring power of a nuclear reactor according to the present invention will now be described hereunder with reference to the accompanying drawings.

Figure 1:
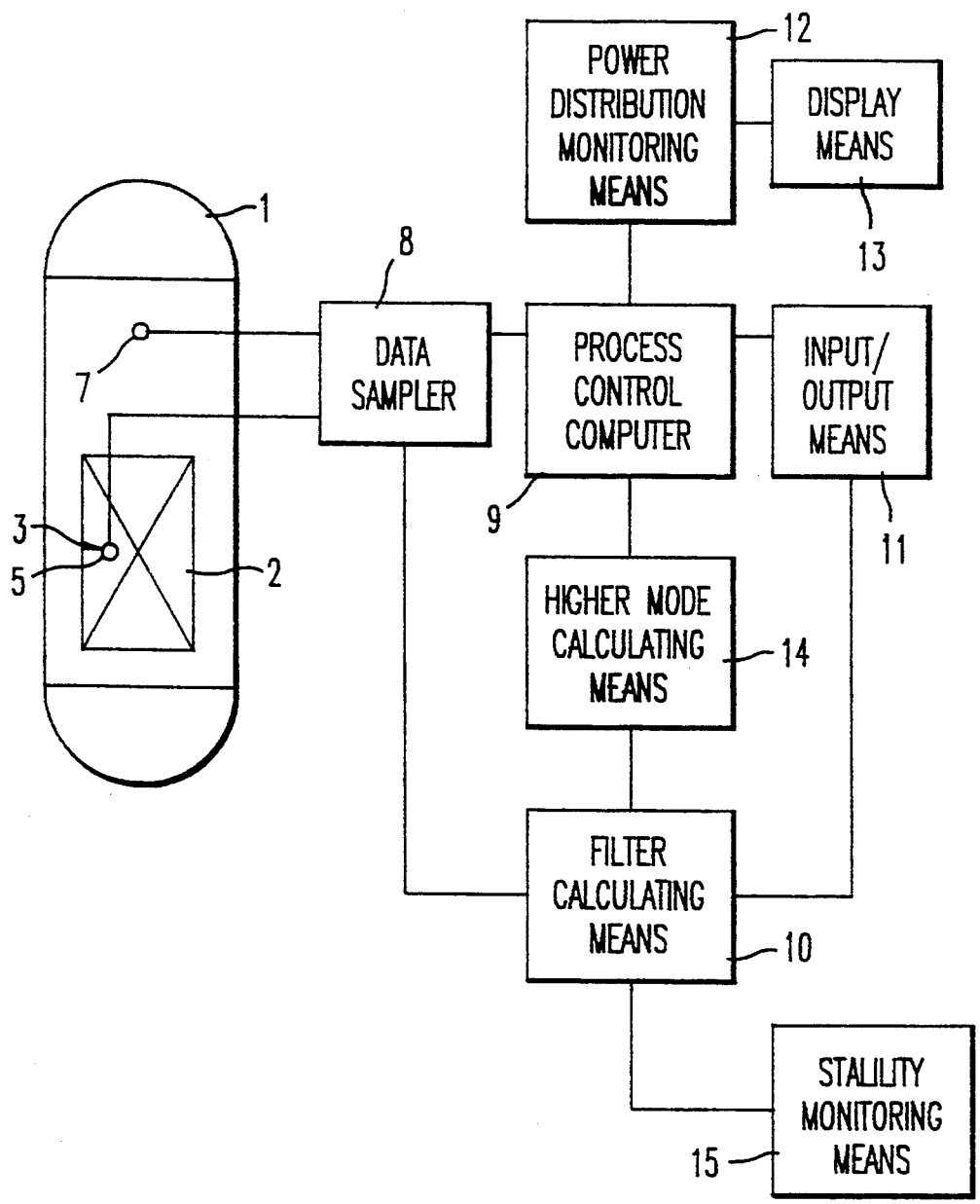
FIG. 1 is an overall structural view which illustrates an embodiment of a system for monitoring power of a nuclear reactor according to a first embodiment.
Figure 2:
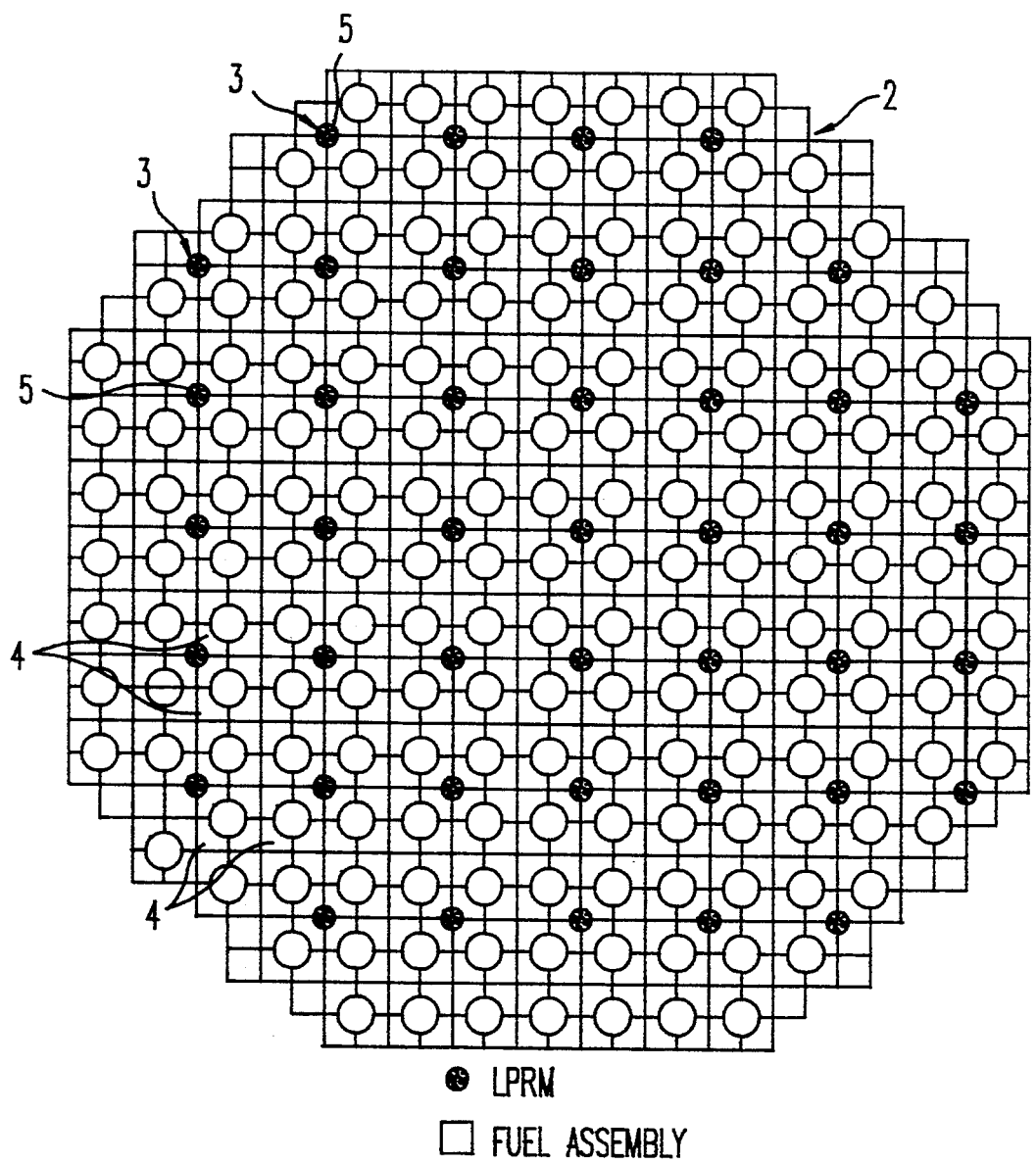
FIG. 2 is a brief cross sectional view which illustrates a neutron flux measuring device distributed in the core of a nuclear reactor.
Figure 3:
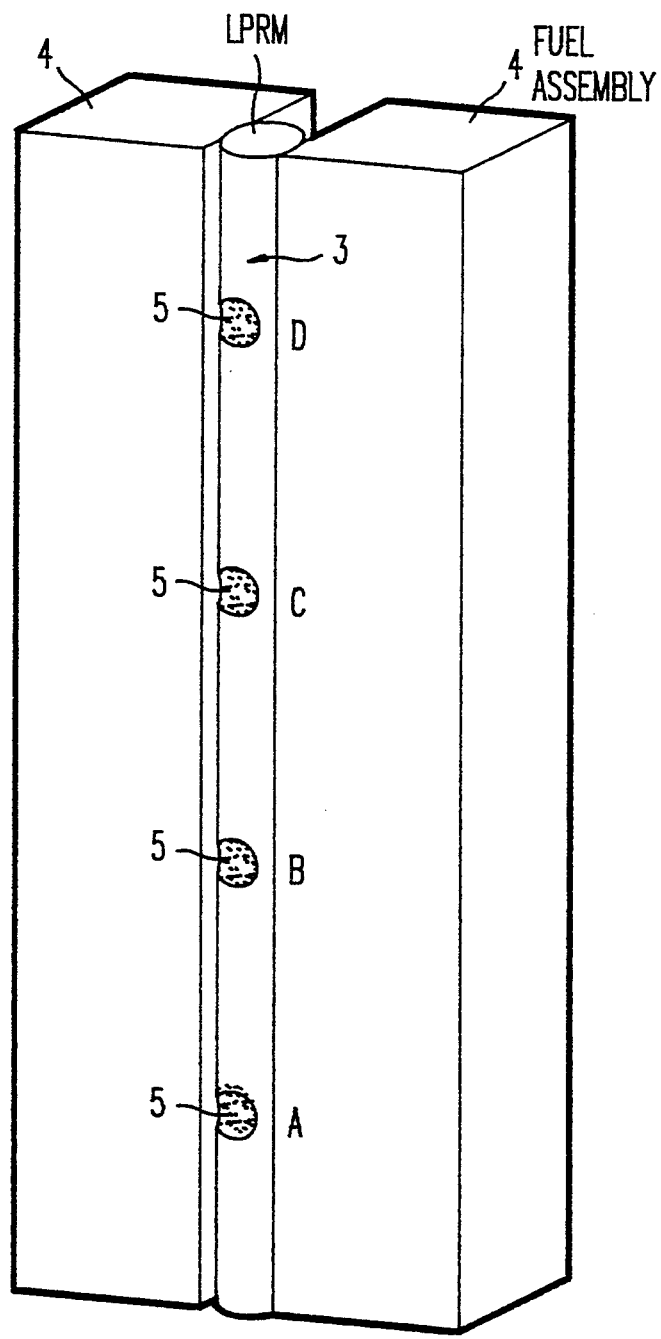
FIG. 3 is an axial arrangement view which illustrates neutron flux detectors disposed in the reactor core of the nuclear reactor.

FIG. 1 is a schematic view which illustrates the overall structure of the apparatus for monitoring power of a nuclear reactor according to a first embodiment of the present invention. Reference numeral 1 in FIG. 1 represents a nuclear reactor, such as a boiling type nuclear reactor (BWR), in which a core 2 is accommodated and the core 2 is provided with a plurality of neutron flux detecting or measuring devices 3. Each of the neutron flux detection devices 3 is, as a nuclear reactor instrumental system, disposed in the core 2 per about four fuel assemblies 4 as shown in FIG. 2 to monitor and make instrument of the power of the nuclear reactor, the axial and radial distributions of the power from the reactor core 2 in an output power operational state of the nuclear reactor. For example, a 1100 MWe class BWR has the core 2 in which 48 neutron flux detection devices 3 are disposed, each neutron flux detection device 3, as shown in FIG. 3, having four neutron flux detectors 5 disposed vertically to serve as local power range monitors (LPRM). The four neutron flux detectors are generally called A, B, C and D when viewed from a lower portion.

The core 2 of the nuclear reactor 1 usually has 100 or more neutron flux detectors 5. For example, a 1100 MWe class BWR has the core in which $43 \times 4 = 172$ (channels) neutron flux detectors are present. A power signal in the form of an analog signal is, as an LPRM signal, taken out from each neutron flux detector 5.

The LPRM signals from the neutron flux detectors 5 are averaged into groups each consisting of about 20 signals by an average power range monitor (APRM), and equally averaged to be formed into APRM signals.

Further, the nuclear reactor 1 includes a core present state, data measuring device 7 as shown in FIG. 1, the core present state data measuring device 7 being used to measure the quantity of state, such as the quantity of flow of a coolant, the temperature of the coolant and the pressure of the same or a core operational state signal (a signal denoting the measured quantity of state of the plant), which is present data (process data) of the core, such as the quantity of the insertions of the control rod. The core operational state signal is also an analog signal.

Power data signals transmitted from each neutron flux detector 5 of the neutron flux detection or measuring device 3 and the core present state data measuring device 7 are supplied to a data sampler 8. The data sampler 8 samples and digitizes data denoted by the analog power data signals (each LPRM signal and the core operational state signal).

Each LPRM signal and the core operational state signal digitized by the data sampler 8 are, as data about the neutron flux and that about the reactor core, transmitted to a process control computer (a process computer) 9 serving as neutron flux distribution calculating means and to a filter calculating device 10.

The process control computer 9 is started periodically or at timing in accordance with a requirement made by an operator to calculate the neutron flux distribution in the fundamental mode in the core 2 at the moment of starting.

The process control computer 9 calculates the neutron flux distribution in the fundamental mode of the core 2 in the present state, the foregoing function corresponding to a monitoring function of the process control computer 9.

The process control computer 9 has a prediction function in addition to the monitoring function, the prediction function being so arranged that the state of the reactor core instructed by the operator is calculated and predicted in accordance with the result of the latest monitoring function to calculate the neutron flux distribution in the fundamental mode in the predicted state of the core.

The neutron flux distribution of the reactor core in the present state calculated by the process control computer 9 and the results of calculations of the neutron flux distribution of the core 2 in the predicted state are, via an input/output device 11, which is input/output means, transmitted to be notified to the operator and supplied to power distribution monitoring device 12 so that the state or the core is displayed by a display device 13.

The results of the calculations performed by the process control computer 9 are supplied to a higher mode calculating device 14. The higher mode calculating device 14 is started in synchronization with the process control computer 9 to solve Equation (2) as to calculate the higher mode of the neutron flux calculated by the process control computer 9, the results of calculations being supplied to the filter calculating device 10. The higher mode calculating device 14 may be included in the process control computer 9 in place of the individual disposition as to be integrally included. Specifically, the method of calculating the higher mode has been disclosed in, for example, document "DETAILED NUMERICAL CALCULATIONS AND EXERCISE" written by Hayato Togawa, published by KYORITSU SHUPAN.

The filter calculating device 10 receives each LPRM signal sampled and digitized by the data sampler 8. In accordance with a digital signal of the supplied measurement signal, the optimum filter is obtained in accordance with the phase difference and the amplitude difference between the signals. On the other hand, the filter calculating device 10 obtains a filter corresponding to a higher mode calculated and extracted by the higher mode calculating device 14. That is, the filter calculating device 10 obtains filters corresponding to the state of the reactor core or the changing characteristics of the respective LPRM signals measured directly.

In the filter calculating device 10, each LPRM signal which has been measured directly and supplied to the filter calculating device 10 is filter-processed (average-operated) by the filter corresponding to the phase difference and the amplitude difference and the filter corresponding to the extracted higher mode. The processed filter signal is supplied to a stability monitoring device 15 serving as stability monitoring means which is connected in an on-line manner and to an input/output device 11. The input/output device 11 transmits a filtered LPRM signal to be notified to the operator.

The stability monitoring device 15 receives the filtered LPRM signal to monitor the decay ratio, the resonant frequency (the period of the oscillations) and the amplitude and the like showing the stability as to detect an oscillation phenomenon and discriminate/evaluate an oscillation mode so that the stability of the state of the reactor core is estimated.

The process of calculations for obtaining desired filters to be performed in the filter computing device 10 will now be described.

The obtained filters are categorized into two types consisting of a filter of a type obtainable by calculating each LPRM signal always supplied from the data sampler 8 and a filter of a type obtainable by extracting the higher mode distribution calculated by the higher mode calculating device 14. The former filter is a filter calculated in accordance with the respective LPRM signals, which are actual measurement signals detected sequentially or continuously, while the latter filter is a filter calculated in accordance with information supplied from the process control computer 9 and reflecting the power distribution in the core 2 corresponding to the change of the operational state, for example, the change of the operational state taken place due to the operation of the control rods or the change of the operational point realized by controlling the re-circulation flow. The latter filter can be obtained by way of the process control computer 9 at the time of the intentional change of the state of the reactor core of the nuclear reactor.

The former filter obtainable by the filter calculating device 10 is obtained by sequentially or at short time intervals (several tens seconds) (or continuously) obtaining the statistic quantity of the respective LPRM signals, which are the actual measurement signals, that is, the cross correlation function and variance of the respective LPRM signals.

The dispersed values reflect the degree of the changes of the respective LPRM signals (the amplitude difference), and therefore, the variance show the importance (weight) of the LPRM signal. The cross correlation function shows the degree of the correlated relationship among the respective LPRM signals by expressing the phase difference of the oscillations of the respective signals. That is, the former filter can be obtained in accordance with the amplitude difference and the phase difference among the respective LPRM signals. The variance and the cross correlation function are defined by a general manner.

The variance and the cross correlation functions respectively are defined by an unbiased estimator as follows:

[Numerical Formula 8]

$$\sigma k^2 = 1/(N-1) \cdot \sum_{i=1}^{N} (Xk(ti) - Xk)^2 \quad (8)$$

[Numerical Formula 9]

$$Ck(m) = 1/(N-L) \cdot \sum_{i=1}^{M} Xk(ti) - Xk(ti)Xk(ti-m) \quad (9)$$

The former filter, which is the first filter, is calculated in such a manner that, for example, the variance value of LPRM signal k (where k is a suffix) is used to obtain standard deviation δk which is the square root of the variance, mean standard deviation value δ of all LPRM signals is obtained, the ratio of the standard deviation δk and the mean standard deviation value δ is obtained, and the ratio δk/δ is made to be a first filter attribute W1 (k). The filter attribute W1 (k) is used to weight the signal. The importance of the LPRM signal corresponding to the degree of the first filter attribute W1 (k) is use to select a LPRM signal having the largest amplitude as a standard signal. Then, the cross correlation function between the standard signal and the residual LPRM signals is calculated. The delay time, at which the cross correlation function is the largest, corresponds to the phase difference from the standard signal. If the delay time is zero, no phase difference presents between the two signals. If the delay time is the half of the amplitude period, the phase difference is 180° C., that is, the two signals are in opposite phases.

Assuming that the delay time for the LPRM signal k from the standard signal is tk and the filter attribute at time t is W2 (k, t), the filter attribute W2 (k, t) is given by W2 (k, t)=Wk (t-tk) when the LPRM signal k is expresses by Xk (t).

That is, the former filter has two filter attributes W1 (t) and W2 (k, t) which are respectively expressed by

[Numerical Formula 10]

$$W1(t) = \sigma k/\sigma \quad (10)$$

[Numerical Formula 11]

$$W2(k,t) = Xk(t-tk) \quad (11)$$

The first and second filter attributes W1 (t) and W2 (k, t) are automatically estimated in a relatively short time of several tens of seconds in accordance with the change of the LPRM signal.

The first filter attribute W1 (k) of the former filter is a weighting coefficient for weighting a portion, in which the LPRM signal is considerably changed and which is therefore assumed to be the oscillation source to use the portion in an emphasized manner. The second filter W2 (k, t) is a phase correction coefficient which eliminates cancelling between the LPRM signals occurring due to the detected phase difference among LPRM signals and which eliminates (synchronizes) the phase difference between the signals to improve the signal sensitivity.

A method of obtaining filter coefficient W3 (k, m) of the latter filter will now be described.

The foregoing filter coefficient is a third filter coefficient corresponding to the change of the power distribution occurring due to the change of the operational region or the like.

The process control computer 9 is started at timing at which data about the reactor core of data about the neutron flux is supplied upon the request from the operator, the process control computer 9 being arranged to calculate the neutron flux distribution (the fundamental mode) in the state of the core at the start time. The central flux distribution in the fundamental mode is a mode which is present most stably in the core 2. In particular, the power distribution in the core 2 is changed while preventing a considerable deviation of the fundamental mode even if a local disturbance or a feedback is effected in the core 2.

If the reactor power is changed in accordance with the fundamental mode, the reactor power can be detected in the conventional manner in which the APRM signal which is obtained by simple averaging and which is supplied from the average power range monitor (APRM) is used. If a local feedback effect or the like is applied to the reactor core 2, there is a possibility a higher mode except the fundamental mode is excited.

A typical higher mode is an oscillation event called "regional oscillations". The foregoing oscillation event excites a spatial higher mode. By using the spatial higher mode distribution as the third filter coefficient W3 (k, m), the latter filter is made to be a filter that selectively emphasizes the change of the excited spatial higher mode.

The reason why the latter filter employs the spatial higher mode distribution as the third filter coefficient W3 (k, m) is as follows.

An assumption is made that the neutron flux distribution in the core in the fundamental mode is Φ0 and the neutron flux distribution in an m-th harmonics is Φm. Since the transient neutron flux distribution f (t) at the time of the oscillation, such as the regional oscillations, can be assumed to be a superposing distribution of the neutron flux distributions Φ0 and Φm of the fundamental mode and the higher mode, the following equation is held.

[Numerical Formula 12]

$$\phi(t) = A0(t) \cdot \phi 0 + \sum_{m=1} Am(t) \cdot \phi m \quad (12)$$

If the neutron flux distribution in the core 2 is uniformly changed in the overall reactor core, magnitude function A0 (t) of the fundamental mode controls and the magnitude function Am (t) of the higher mode is a value substantially approximating zero.

In an oscillation effect, such as the regional oscillations, in which the spatial higher mode is excited, the magnitude function A0 (t) of the fundamental mode is substantially constant but a certain component in A0 (t) is changed mainly.

The neutron flux distributions Φ0 and Φm of the fundamental mode and the higher mode hold an orthogonal relationship with each other. Therefore, integrating the neutron flux distribution for the overall reactor core (the capacity of the reactor core): [Numerical Formula 13]

$$\int_{wholecore} \phi m \cdot \phi n \, dV = \sigma mn \tag{13}$$

where wmn is called a Krnecker's delta. Equation (13) can be expressed by the following formula: [Numerical Formula 14]

$$\int_{wholecore} \phi m \cdot \phi n \, dV = \begin{array}{l} 1, \text{ (if } m = n) \\ \epsilon, \text{ (if } m \neq n, \epsilon << 1) \end{array} \tag{14}$$

Therefore, by using an n-th harmonics $\Phi n$ as the latter filter, an average signal is expressed as follows: [Numerical Formula 15]

$$\int_{wholecore} \phi(t) \cdot \phi n \, dV = \tag{15}$$

$$\int_{wholecpre} \left( A0(t) \cdot \phi(t) + \sum_{m=1} Am(t)\phi m \right) \phi n \, dV =$$

$$An(t) + \sum_{m \neq n} Am(t) = An(t)$$

Therefore, only the change of higher mode components for use in the filter can selectively be extracted.

As a result, by adding a higher mode distribution calculating function to the process control computer 9 or by independently providing a higher mode distribution calculating device 14, the higher mode of the neutron flux distribution in the core 2 at the time of the start of the process control computer 9 and by using the neutron flux distribution $\Phi n$ in the higher mode as the filter, the change of the mode of the ruling neutron flux distribution in the regional oscillations can be emphasized and extracted.

Since the neutron flux distribution in the higher mode cannot be easily excited in proportion to the increase in the order, the higher mode, to which attention is paid actually, is limited to about first to third harmonics.

In order to take a countermeasure against a pump trip or the like occurring at the transient operation of the nuclear reactor, the state of the core after the transient effect has been settled is estimated by the process control computer 9 or the higher mode calculating device 14 simultaneously with the transient effect. Further, the higher mode distribution in the estimated state is obtained to be stored as the third filter coefficient W3 (k, m). By performing switching to the filter corresponding to the transient event at the time of the occurrence of the transient event, adaptation to the state of the reactor core at the time of the transient event can be performed.

The operation of the apparatus for monitoring the power of the nuclear reactor will now be described.

The reactor power distribution in the core 2 of the nuclear reactor 1 is detected by each neutron flux detector 5 of the neutron flux detection or measuring device 3 in such a manner that the axial and radial neutron flux distributions in the core 2 are measured. The analog LPRM signals transmitted from the respective neutron flux detector 5 and the core operational state signal transmitted from the core present state data measuring device 7 are supplied to the data sampler 8 to be digitized.

The LPRM signal and the core operational state signal sampled and digitized by the data sampler 8 are supplied to the process control computer 9. In the process control computer 9, the signals are calculated periodically or at a request made by the operator. The result of the process is notified to the operator by way of the input/output device 11 and also supplied to the power distribution monitoring device 12 so that the reactor power distribution is monitored, the state of the reactor core being displayed by the display device 13.

Figure 4:
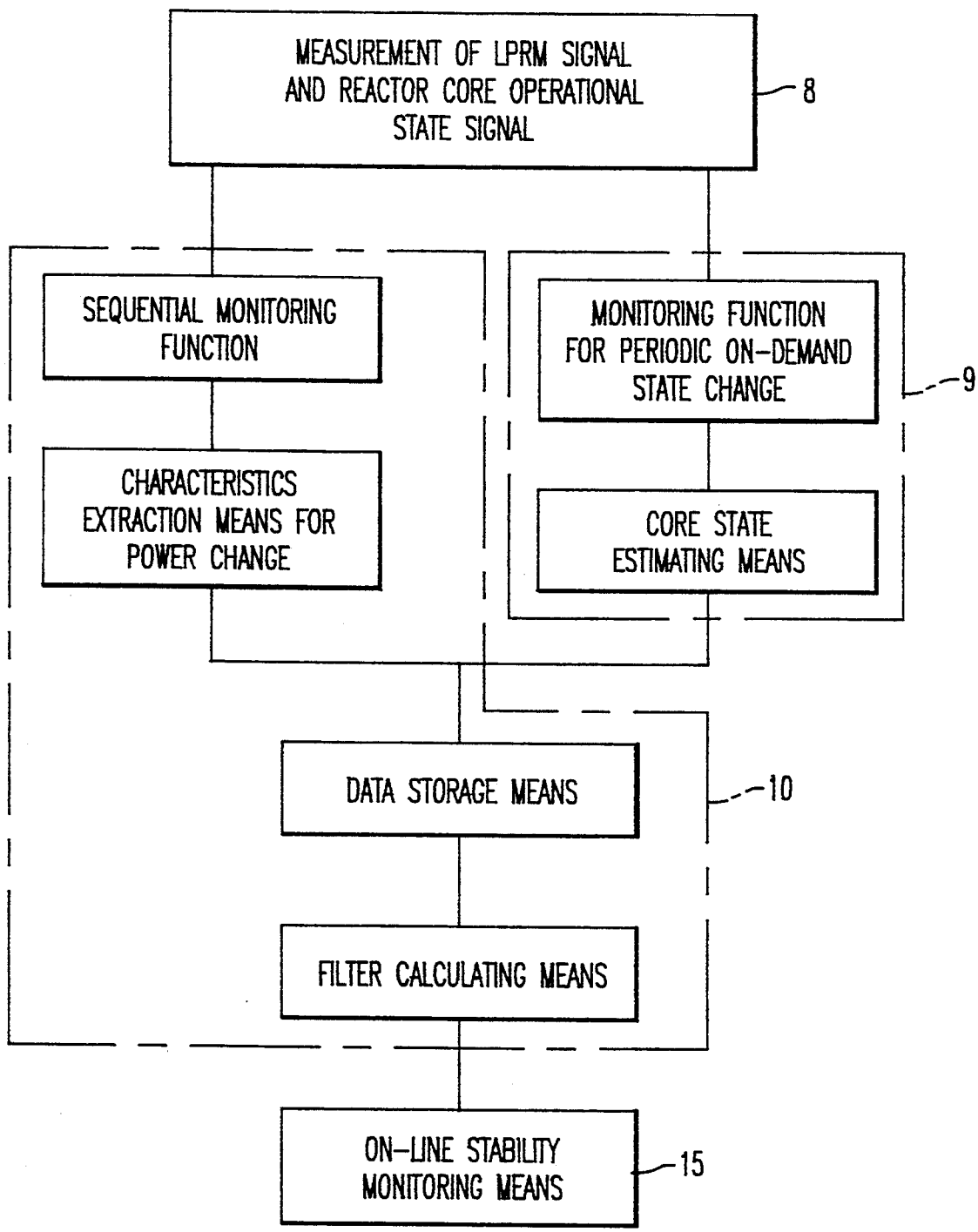
FIG. 4 illustrates a block diagram of the system for monitoring power of a nuclear reactor according to the present invention.
Figure 5:
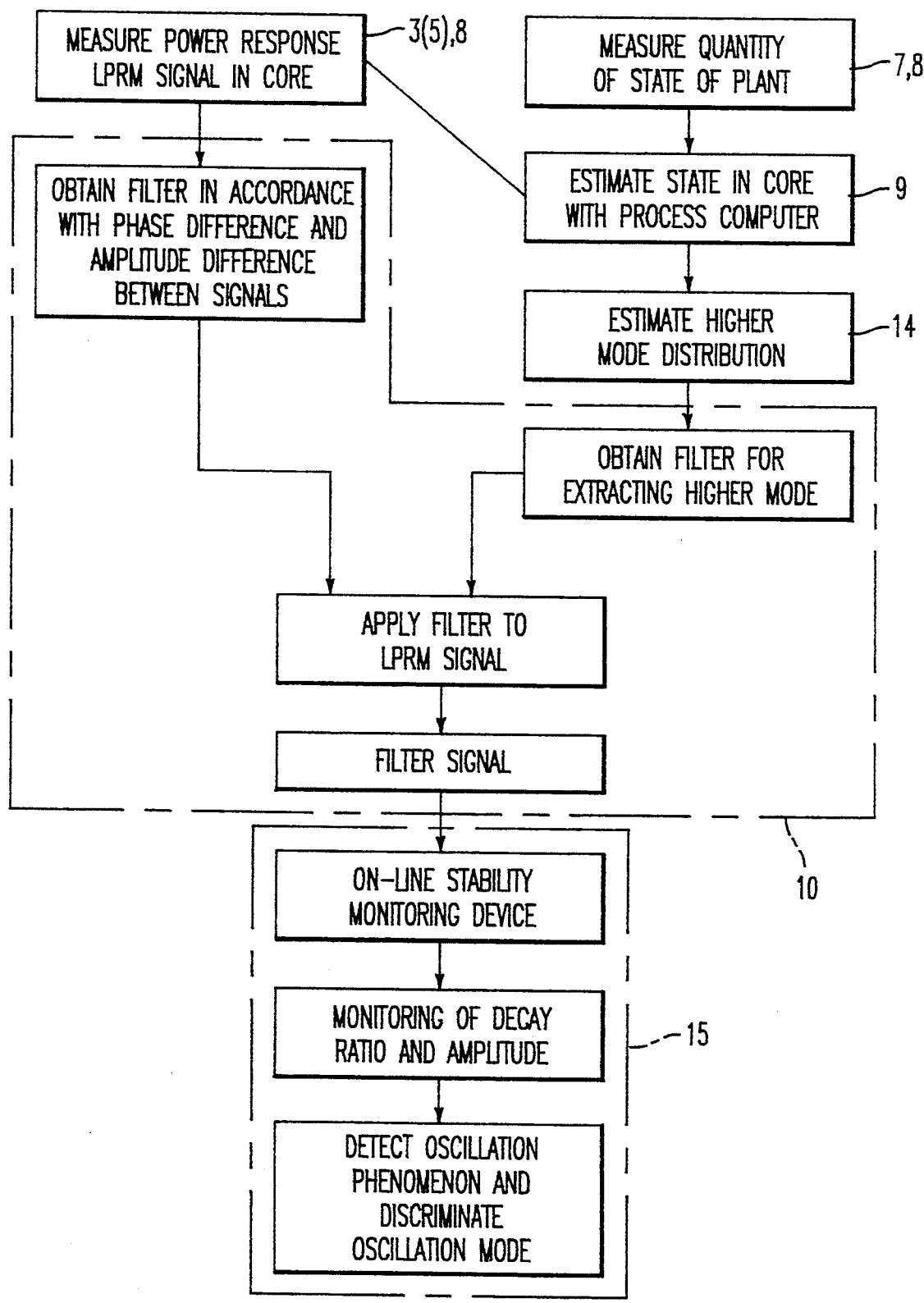
FIG. 5 illustrates the flowchart of monitoring the power in the system for monitoring power of the nuclear reactor according to the present invention.

The process control computer 9 is, as shown in FIGS. 4 and 5, supplied with the LPRM signal in the core 2 detected by each neutron flux detector 5 and the plant state quantity measurement signal, which is the reactor core operational state signal supplied from the core present data measuring device 7 to calculate and estimate the state in the core 2 periodically or at the requirement made by the operator. The process control computer 9 calculates (monitoring function) the neutron flux distribution of the fundamental mode in the core 2 and calculates (prediction function) the neutron flux distribution $\Phi 0$ in the fundamental mode in the core state instructed by the operator in accordance with the results of the calculations.

The core state signal (a process signal) calculated by the process control computer 9 is supplied to the higher mode calculating device 14 in which the higher mode of the neutron flux distribution in the core 2 is estimated. That is, the neutron flux distribution (the power distribution) $\Phi n$ in the spatial higher mode is calculated.

The spatial higher mode power distribution signal thus calculated is supplied to the filter calculating device 10, which is used to obtain the filter reflecting the power distribution in the core 2 realized due to the change of the operational state. The filter has the third filter W3 (k, m) to selectively emphasize the change of the spatial higher mode, the filter serving as a filter for extracting the higher mode.

The filter calculating device 10 is sequentially or continuously supplied with each LPRM signal, which is the actual measurement signal, from the data sampler 8, the filter calculating device 10 being able to obtain a filter corresponding to the amplitude difference and the phase difference among the LPRM signals. The filter has the first and second filter coefficients W1 (t) and W2 (k, t).

The respective LPRM signals are caused to pass through the high mode extraction filter and the filter corresponding to the amplitude difference and the phase difference of the respective LPRM signals obtained by the filter calculating device 10 to be filtered so that extraction of the spatial higher mode, weighting the signals and an averaging operation for correcting the phase difference are performed.

The LPRM signals (the filter signals) subjected to the averaging process by using the respective filters obtained by the filter calculating device 10 are then received by the stability monitoring device 15 so that the decay ratio, the resonant frequency and the amplitude, which are the stability indexes, are monitored. In accordance with the result of the monitoring, the oscillation phenomenon is detected to discriminate and evaluate the oscillation mode.

Figure 7A:
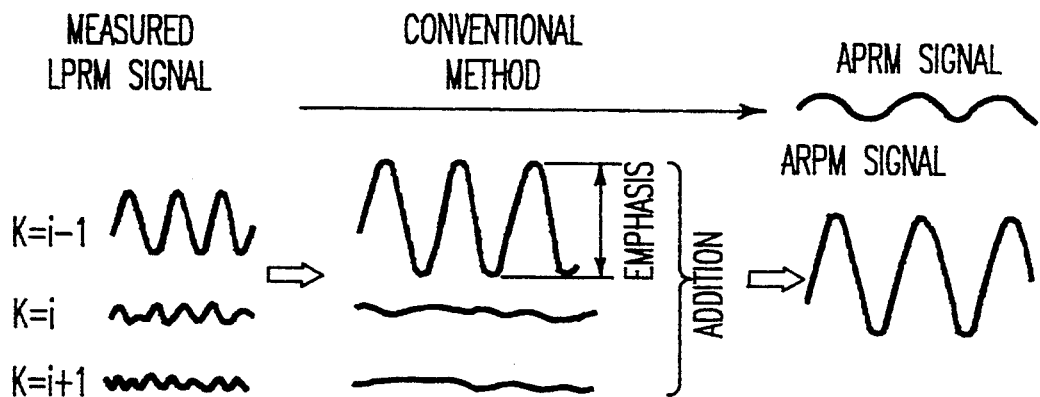
FIGS. 7A and 7B illustrate the effects of a weighting filter and a phase correction filter obtained by the filter calculating means in contrast with the conventional example.
Figure 7B:
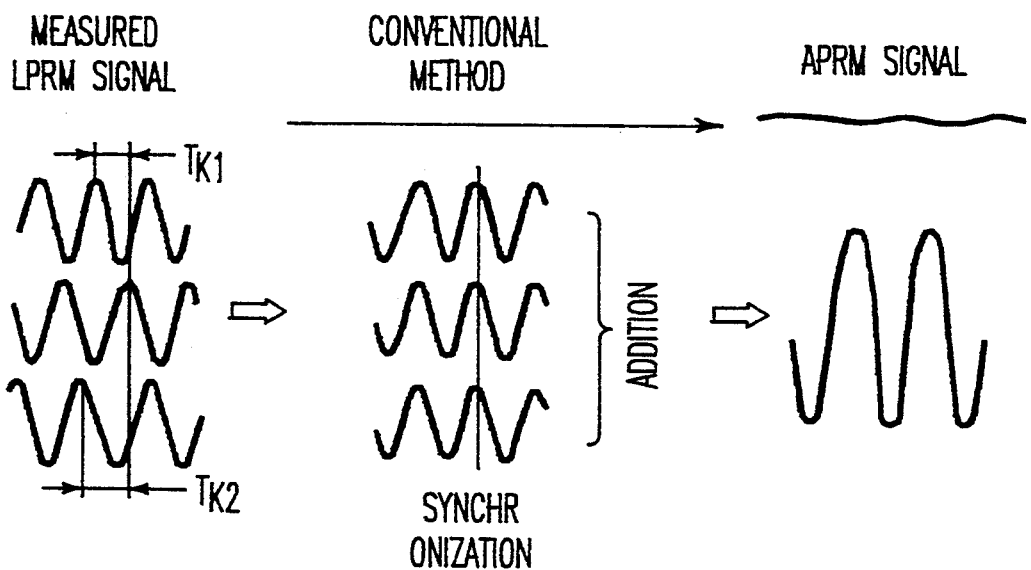

The apparatus for monitoring the power of the nuclear reactor is so arranged that the LPRM signals, which are the actual measurement signals, are allowed to pass through the respective filters obtained by the filter calculating device 10. As a result, power responses having large amplitudes as shown in FIGS. 7A and B can be obtained. Since the conventional apparatus for monitoring power of a nuclear reactor is so simply arranged that the respective LPRM signals, which are the actual measurement signals, are equally averaged to obtain the APRM signal, the respective APRM signals are equally averaged, and therefore, cancelling takes place among the APRM signals.

Figure 6:
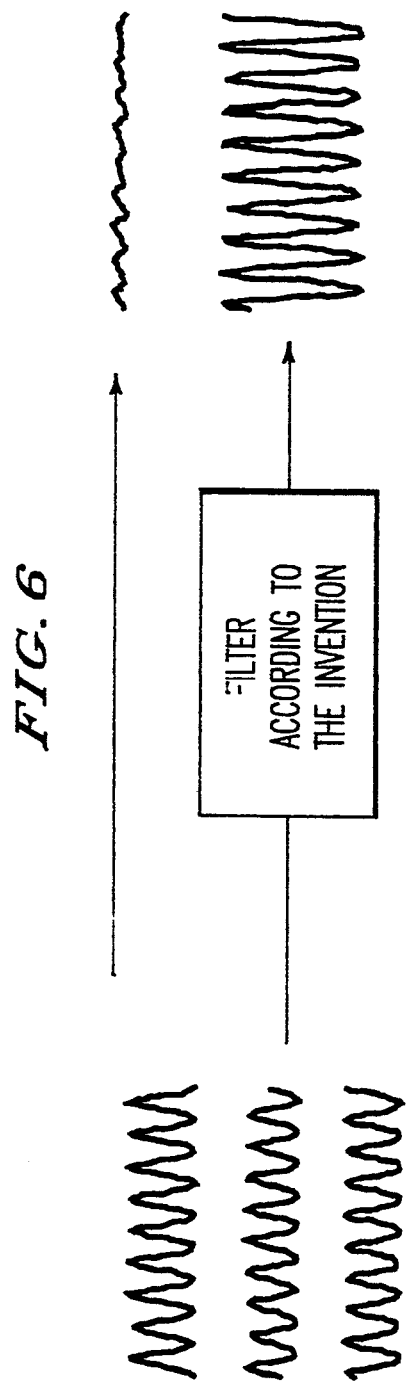
FIG. 6 is a view which illustrates an example showing the effect of the filter obtained by filter calculating means provided for the system for monitoring the power of a nuclear reactor according to the present invention in comparison with a conventional method.

FIG. 6, FIGS. 7A and B show schematic examples in which filtering is performed by using the higher mode extraction filter, the weighting filter and the phase correction filter in contrast with the conventional example in which the APRM signal is obtained by the equal averaging method.

Figure 8:
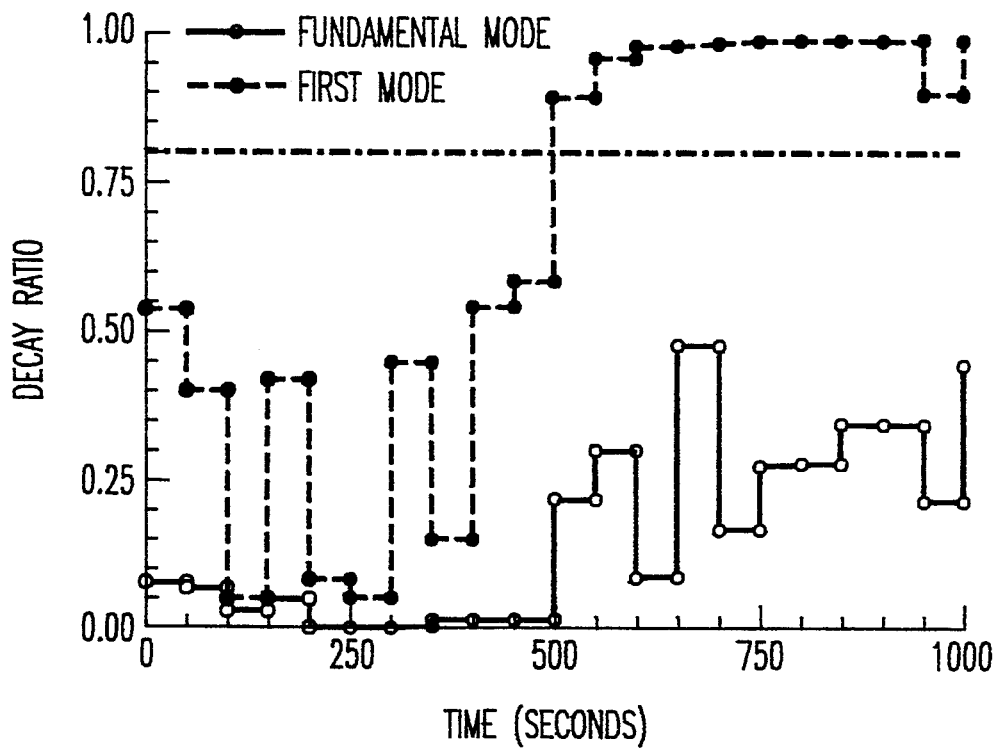
FIG. 8 illustrates an example of response due to a decay ratio in an example of the monitoring of the stability performed in the system for monitoring power of a nuclear reactor according to the present invention.

An example of response of the decay ratio obtained from the response after the process performed by making use of the higher mode extraction filter shown in FIG. 6 is shown in FIG. 8. FIG. 8 shows an example of the response realized by monitoring by making use of the stability monitoring device 15, this example using plant data in which regional oscillations have been observed.

In this response example, time series data of the regional oscillations is used, and power signals are monitored by the stability monitoring device 15, the power signals being signals obtained by averaging all LPRM signals by applying the filter (its filter coefficient is W3 (k, m)) reflecting the spatial higher mode distribution to all LPRM signals. The oscillation state of the regional oscillations is an example in which a first mode is excited as the higher mode. The fundamental mode shown in FIG. 8 corresponding to a conventional case where the state of the reactor core is monitored by using the APRM signal.

Defining the unstable region in the operation of the nuclear reactor to be a state in which the decay ratio is 0.8 or more, the result of the monitoring performed in accordance with the response of the neutron flux distribution of the fundamental mode component of the neutron flux distribution shows that the decay ratio is 0.8 or less and a discrimination is made that the reactor core state is stable. However, it can be understood from the response of the neutron flux distribution of the higher mode component that the decay ratio exceeds 0.8 and rapidly makes unstable the oscillations. The unstability of the core state coincides with the observed data about the actual regional oscillations. Therefore, it can be understood that the stability of the core state can accurately be discriminated from the response of the decay ratio obtained from the first mode component of the higher mode.

Figure 9:
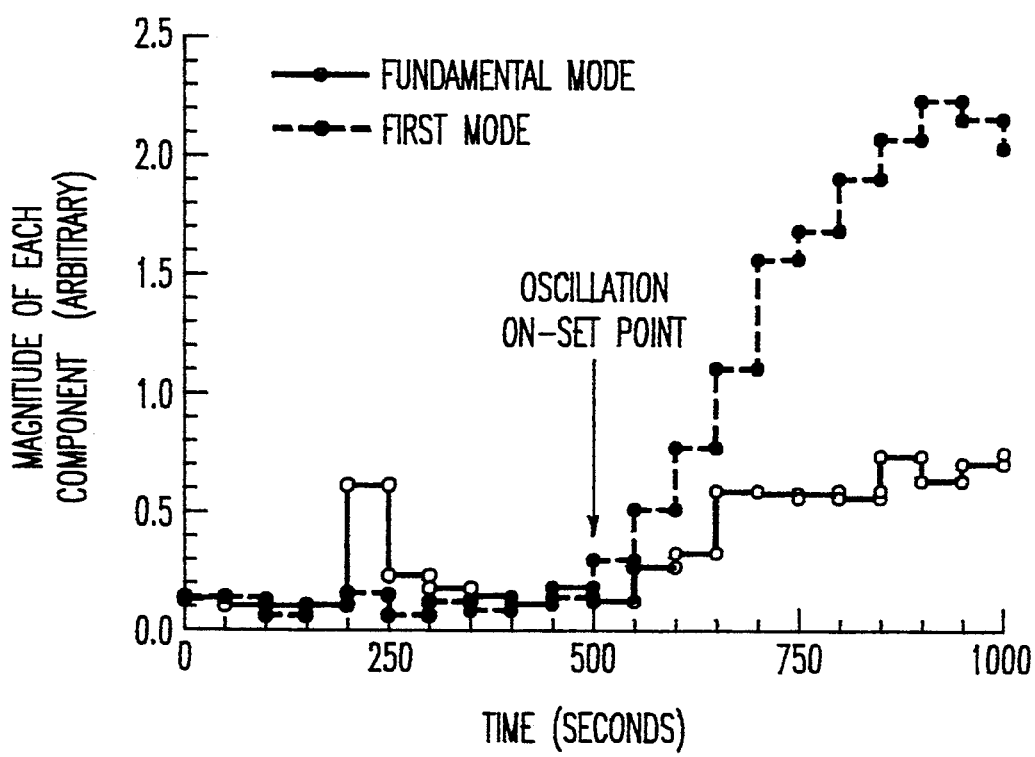
FIG. 9 illustrates is a view for the comparison made between the fundamental mode component and the first mode component of the neutron flux distribution in the example of the monitoring of the stability performed in the system for monitoring power of a nuclear reactor according to the present invention.

That is, FIG. 9 shows the magnitudes of the oscillations of the fundamental mode and the first mode components of the neutron flux distribution, that is, the amplitudes of parameters corresponding to A0 (t) and A1 (t) of Equation (12).

As can be understood from the response examples of the fundamental mode component and the first mode component of the neutron flux distribution shown in FIG. 9, the amplitude of the primary mode component is small in the vicinity of 500 seconds which has been discriminated to be unstable in terms of the decay ratio shown in FIG. 8, and the amplitude rapidly grows and oscillations are generated. By computing both of the decay ratios and the magnitudes of the oscillations to comparisons, the oscillation state can be monitored more finely. Therefore, the power oscillation phenomenon of the reactor core and the oscillation mode can be monitored more accurately.

Although the response examples shown in FIGS. 8 and 9, the higher mode extraction filter is used to discriminate and evaluate the stability of the state of the reactor core, the discrimination and the evaluation of the stability of the state of the reactor core can be performed similarly by using the weighting filter W1 (k) or the phase correction filter W2 (k, t) obtainable by the filter computing device.

The system for monitoring the power of a nuclear reactor of this embodiment is a stability monitoring apparatus that obtains the filters for specifically extracting the oscillation modes in accordance with the spatial higher mode power distribution to discriminate the stability of the core in response to the LPRM signal processed by the filters.

The system for monitoring the power of a nuclear reactor uses the two types of filters calculated by the filter calculating device 10, the two types of the filters being the filter that corresponds to the change of the power distribution taken place due to the change of the operational state and adapted to the change of the power distribution at the transient state and the filter corresponding to the sequential change of the power signals, which are the actual measurement signals. Therefore, the monitoring of the stability of the core can be performed further accurately.

The system for monitoring the power of a nuclear reactor is able to accurately detect and discriminate the stability of the state of the core including the power change, which has been difficult to be detected by the conventional APRM signal as compared with the conventional APRM signal obtained by simply averaging the analog signals. Therefore, the safety can be improved and the availability can be improved.

A second embodiment of the system for monitoring the power of a nuclear reactor will now be described.

Figure 10:
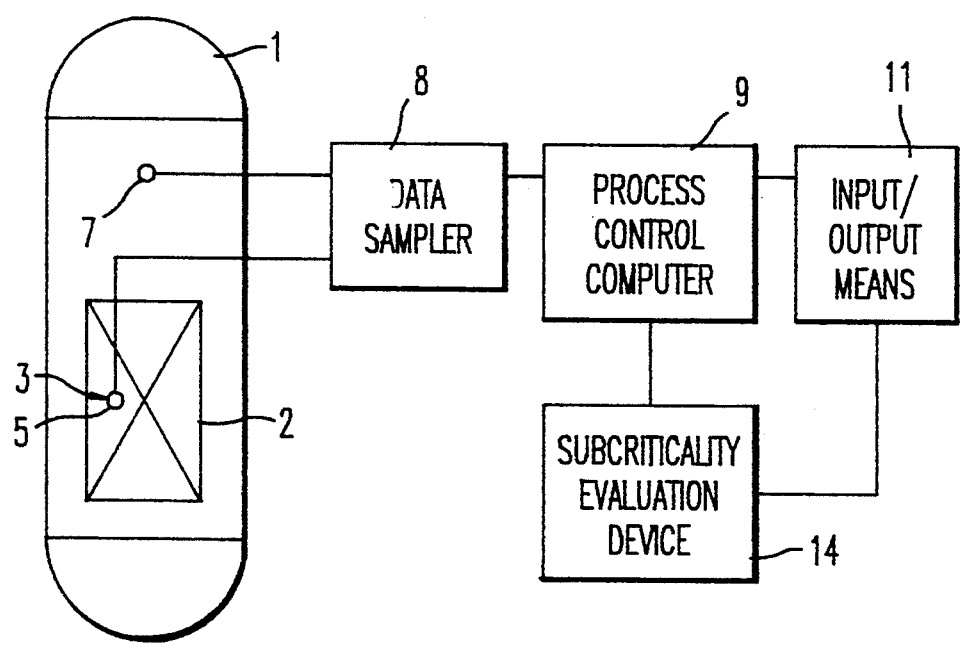
FIG. 10 is an overall structural view which illustrates a second embodiment of the system for monitoring power of a nuclear reactor according to the present invention.

The system for monitoring the power of a nuclear reactor according to this embodiment is basically different from the system for monitoring the power of a nuclear reactor shown in FIG. 1 in that a subcriticality evaluation device 17 serving as subcriticality evaluation means as shown in FIG. 10. The same structures as those of the apparatus for monitoring the power of a nuclear reactor shown in FIG. 1 are given by the same reference numerals and their descriptions are omitted here.

The subcriticality evaluation device 17 is connected to the process control computer 9, the results of calculations performed by the process computer 9 being supplied to the subcriticality evaluation device 17 as shown in FIG. 10. The subcriticality evaluation device 17 estimates the subcriticality in the operational state in accordance with the results of the calculations performed by the process control computer 9.

The subcriticality of a nuclear reactor is affected by a temporary state of the reactor core as described above because it depends upon the power distribution, that is, the distribution form of the fundamental mode.

Figure 11A:
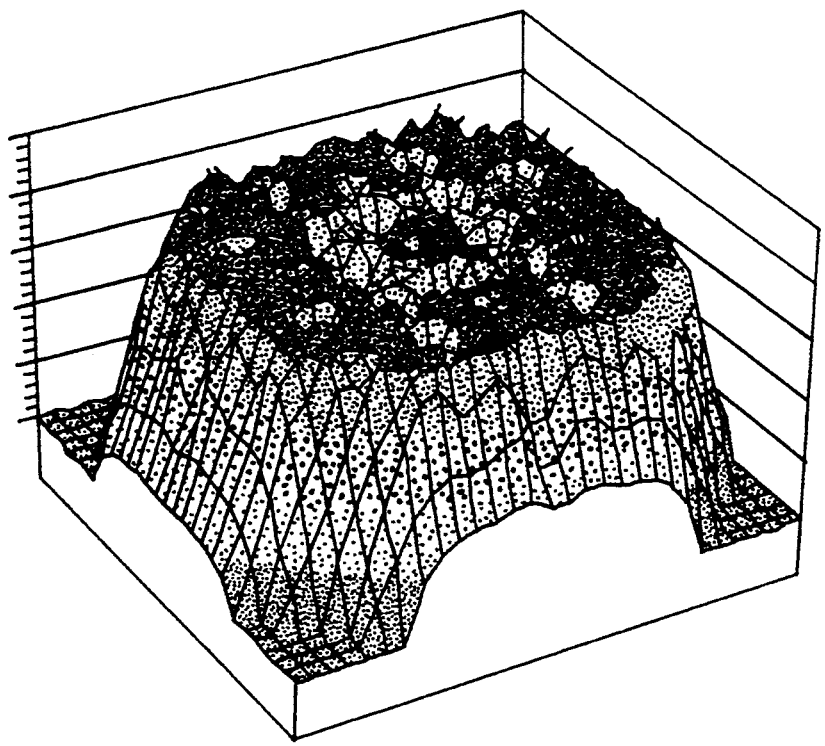
FIG. 11A is an explanatory view which illustrates a flat distribution form of the fundamental mode and FIG. 11B is an explanatory view which illustrates a distribution form of the fundamental mode with high power region in the periphery thereof.
Figure 11B:
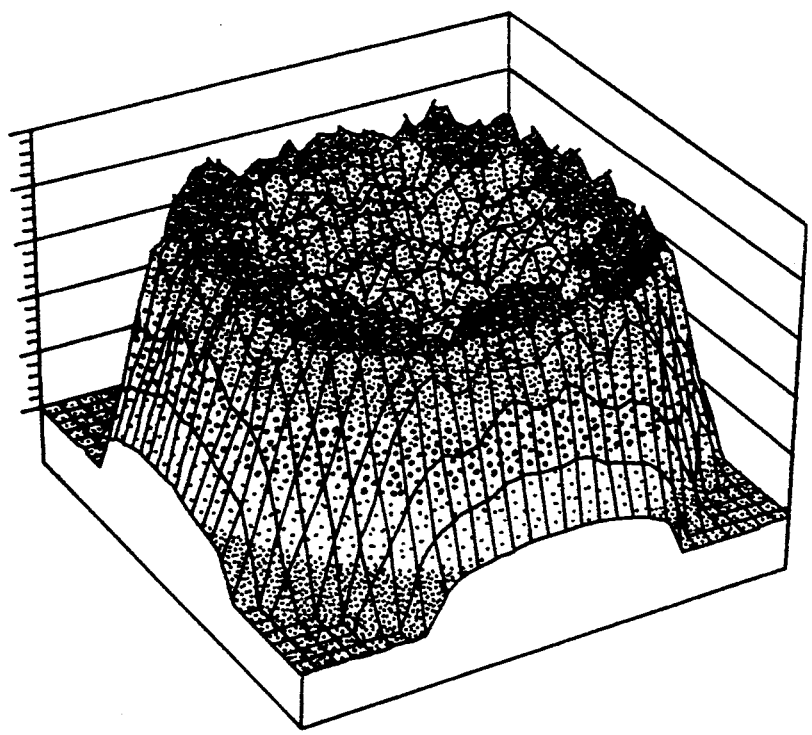

FIGS. 11A and 11B show, together with the subcriticality, the neutron flux distribution in the fundamental mode in a certain state of the reactor core of a 1,100,000 KWe class boiling water nuclear reactor similarly to FIGS. 17A and 17B and FIGS. 18A and 18B. In FIG. 11A, a relatively flat neutron flux distribution is realized, and therefore, the subcriticality exceeds 1. In FIG. 11B, the control rods are inserted into the central portion of the reactor core, and therefore, a neutron flux distribution, the periphery of the reactor core is raised, is realized and the subcriticality is 1 or less.

As can be understood from FIGS. 11A and 11B, the subcriticality depends upon the distribution form of the fundamental mode of the neutron flux and is further reduced in a state of the reactor core further approximating the first mode distribution form, that is, the fundamental mode is high in the periphery of the reactor core. As an index for evaluating the difference in the distribution form of the neutron flux, RL value obtainable by the following Equation (16) can be employed.

[Numerical Formula 16]

$$RL = Sum\phi_1^2 L1 / SumL1 \qquad (16)$$

where $\phi_1$: fundamental mode averaged in the axial direction of fuel bundle 1

L1: distance of fuel bundle 1 from the center of reactor core

The sum of Equation (16) is obtained from all fuel bundles (the fuel assemblies) in the reactor core.

Figure 12:
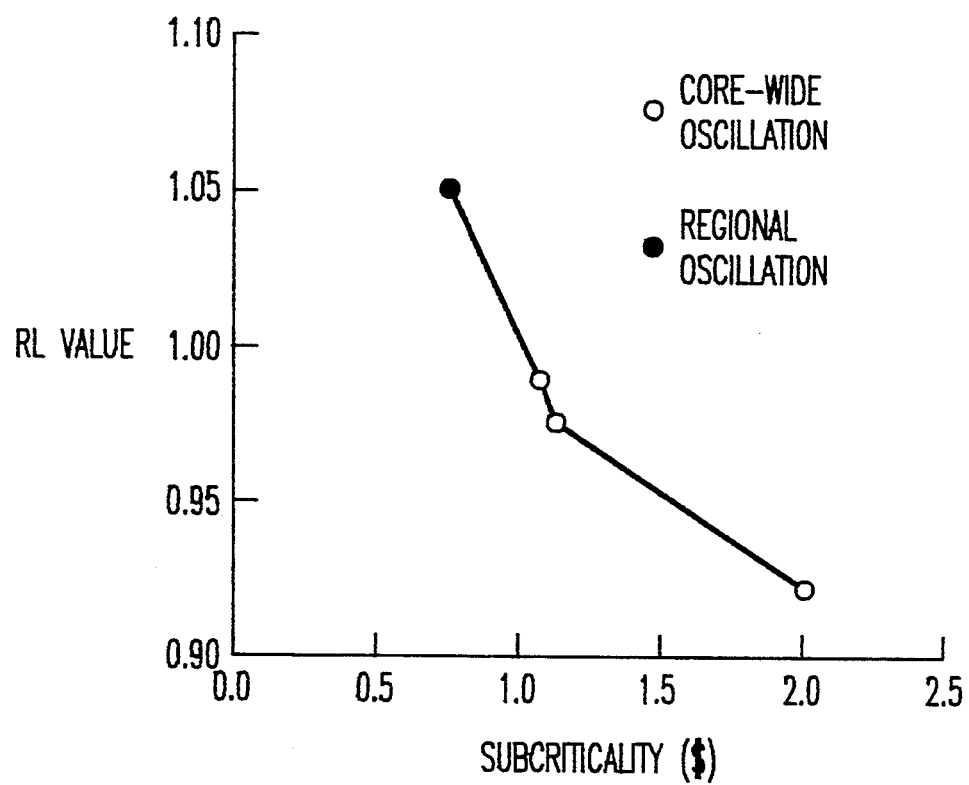
FIG. 12 is a graph showing the relationship between the subcriticality and an RL value.

The RL value takes small value with a flat power distribution (the neutron flux distribution) as shown in FIG. 11A, while it takes large values with a periphery high power distribution as shown in FIG. 11B. It can be understood that the RL value holds a controversial relationship with the subcriticality. FIG. 12 shows the relationship between the subcriticality and the RL value at the oscillation commencement point in an oscillation case of the reactor power which has taken place in an overseas plant recently. The oscillation case shown in FIG. 12 includes core-wide and regional oscillations. In FIG. 12, the white circles indicate the core-wide oscillation and the black circles indicate the regional oscillations. As can be understood from FIG. 12, the regional oscillations are observed in a state where the subcriticality is small, and FIG. 12 confirms the relationship between the subcriticality and the RL value. Therefore, by previously obtaining the relationship between the subcriticality and the RL value for a specific operation cycle for the nuclear reactor, the subcriticality in the state of the reactor core can instantaneously be estimated from the relationships expressed by Equation (16) and FIG. 12 by only obtaining the fundamental mode of the neutron flux distribution in an arbitrary state of the reactor core.

Further, if the subcriticality estimated by the foregoing method meets the following condition, the subcriticality evaluation device 17 discriminates that the regional oscillations can be excited and notifies this to the operator by way of the input/output device 11.

[Numerical Formula 17]

$$\Delta\lambda < EPS \qquad (17)$$

where EPS is a predetermined value.

The input/output device 11 has the following functions:
  a. To display the result of the monitoring function of the process control computer 9;
  b. To be used to estimate the state of the reactor core when the process control computer 9 is caused to execute its prediction function;
  c. To display the result of the monitoring of the power control device.

Figure 13:
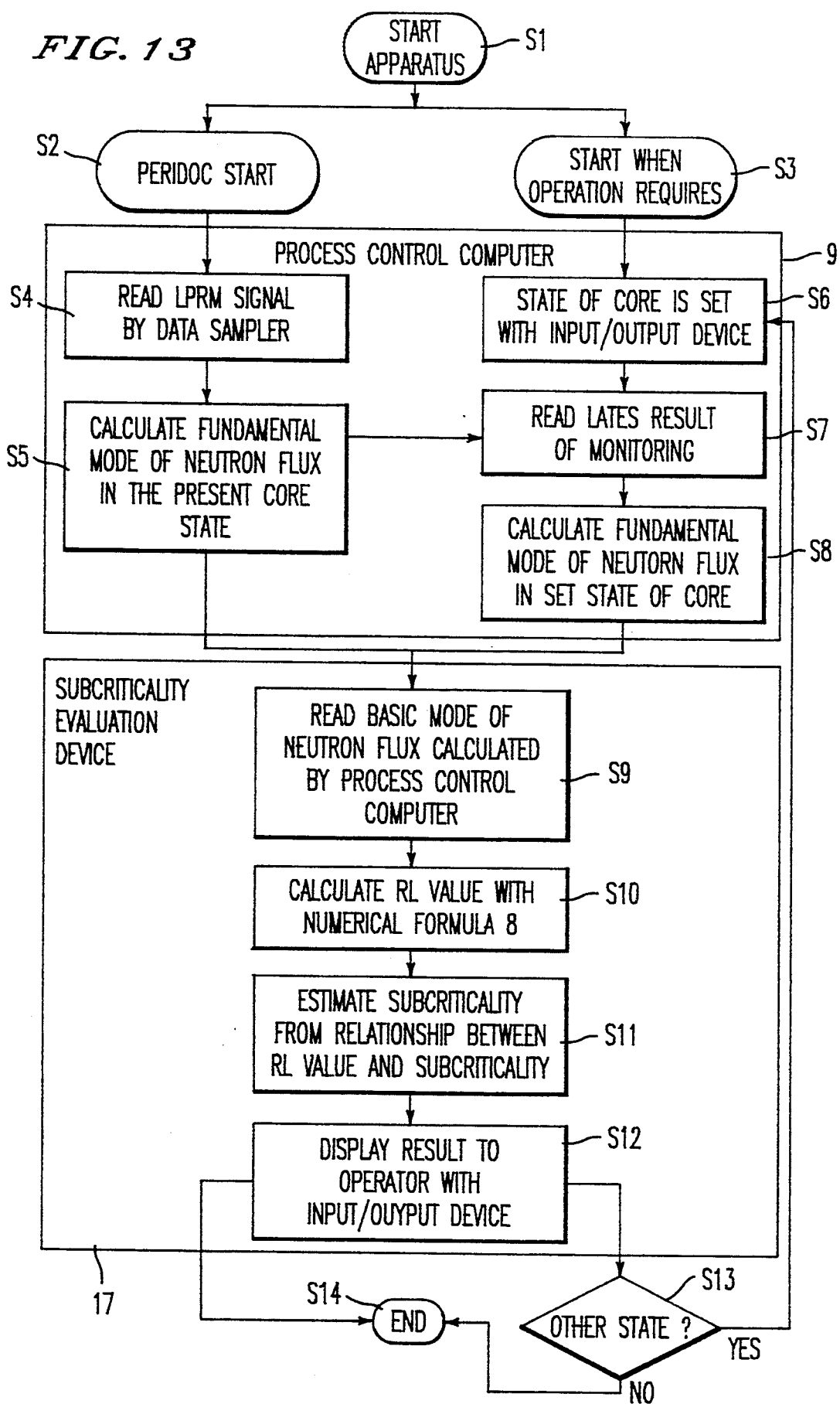
FIG. 13 is a flowchart which illustrates the flow of the process to be performed by the system for monitoring power of a nuclear reactor according to the second embodiment.

FIG. 13 illustrates a flow of the process to be performed in the system for monitoring the power of a nuclear reactor according to this embodiment. Referring to FIG. 13, the operation of this embodiment will now be described.

When the system for monitoring the power of a nuclear reactor is started in step S1, the process control computer 9 is started periodically in step S2 or at the time of a requirement in step S3 made by the operator.

When the periodical starting is performed, the process control computer 9, in step S4, reads the LPRM signals from the respective neutron detectors 5 through the data sampler 8 to calculate the basic mode of the neutron flux in the present state of the reactor core in step S5.

When starting upon the requirement made by the operator is performed, the process control computer 9 first sets the state of the reactor core by using the input/output device 11 in step S6, and reads the result of the latest monitoring in step S7. In next step S8, the process control computer 9 calculates the fundamental mode of the neutron flux distribution in the set state of the reactor core.

The subcriticality evaluation device 17 first reads of the fundamental mode of the neutron flux calculated by the process control computer 9 in step S9, calculates the RL value from Equation (16) in step S10 and estimates the subcriticality of the reactor core from the relationship between the RL value and the subcriticality in step S11. In step S12, the subcriticality evaluation device 17 displays and notifies the result to the operator by way of the input/output device 11.

In the next step S13, a discrimination is made whether or not the other state is present. If it is present, the flow returns to step S6. If the same is not present, the process is completed in step S14.

Thus, the operator makes use of the prediction function of the process control computer 9 to easily predict an arbitrary state of the reactor core, for example, where the re-circulation pump trips and the core flow reduces to a natural circulation or a case when the selected rods have been inserted (SRI) to prevent the core-wide oscillation. Further, the subcriticality in the foregoing predicted state can quickly be estimated.

Although many control rod patterns are usually provided for use to perform the selected rod insertion (SRI), the optimum control rod pattern capable of preventing the regional oscillations can be selected by evaluating the state of the core with respect to all of the provided control rod patterns.

Figure 14:
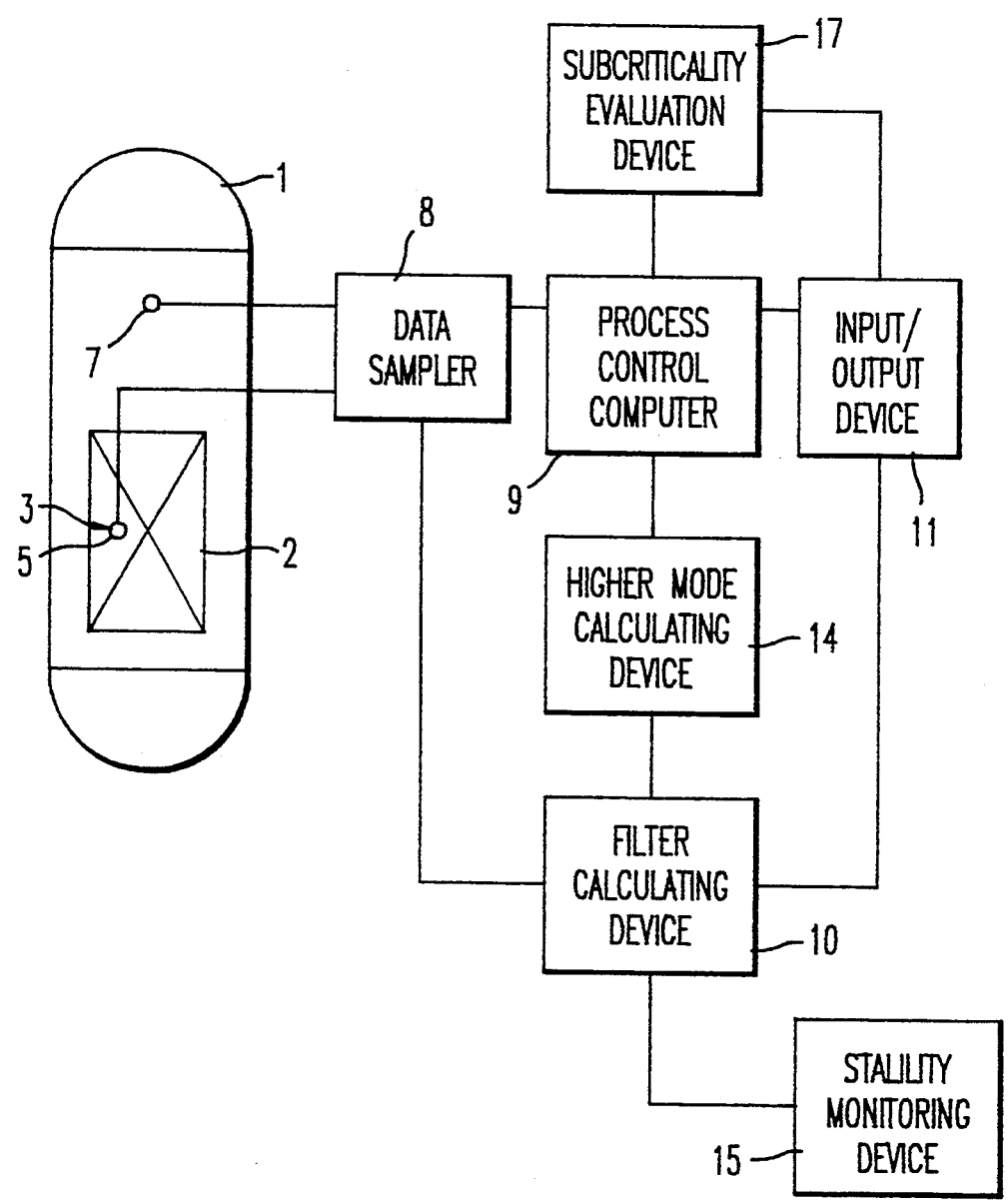
FIG. 14 is an overall structural view which illustrates a third embodiment of the system for monitoring power of a nuclear reactor according to the present invention.

FIG. 14 illustrates a third embodiment of the system for monitoring the power of a nuclear reactor according to the present invention.

The system for monitoring the power of a nuclear reactor according to this embodiment comprises both a filter computing device serving as the filter computing means and the subcriticality evaluation device serving as the subcriticality evaluation means. Specifically, the structure is arranged in such a manner that the subcriticality evaluation device is included by the apparatus for monitoring the power of a nuclear reactor shown in FIG. 1. The same structures are given by the same reference numerals and their descriptions are omitted here.

The system for monitoring the power of a nuclear reactor according to this embodiment estimates the easiness of the occurrence of the power oscillation phenomenon, such as the regional oscillations, that cannot easily be detected by the conventional APRM signal, from the viewpoint of the spatial higher mode subcriticality by means of the subcriticality evaluation device.

Further, the filter computing device is used to obtain the filter for extracting the characteristics of the changes of the respective LPRM signals, the filter thus-obtained is used to filter and average the respective LPRM signals so that the operational state of the reactor core can be monitored. Therefore, the system for monitoring the power of a nuclear reactor is able to estimate the easiness of the occurrence of the regional oscillations, to simultaneously control the reactor core while preventing the regional oscillations and to monitor the oscillation state of the core.

Figure 15:
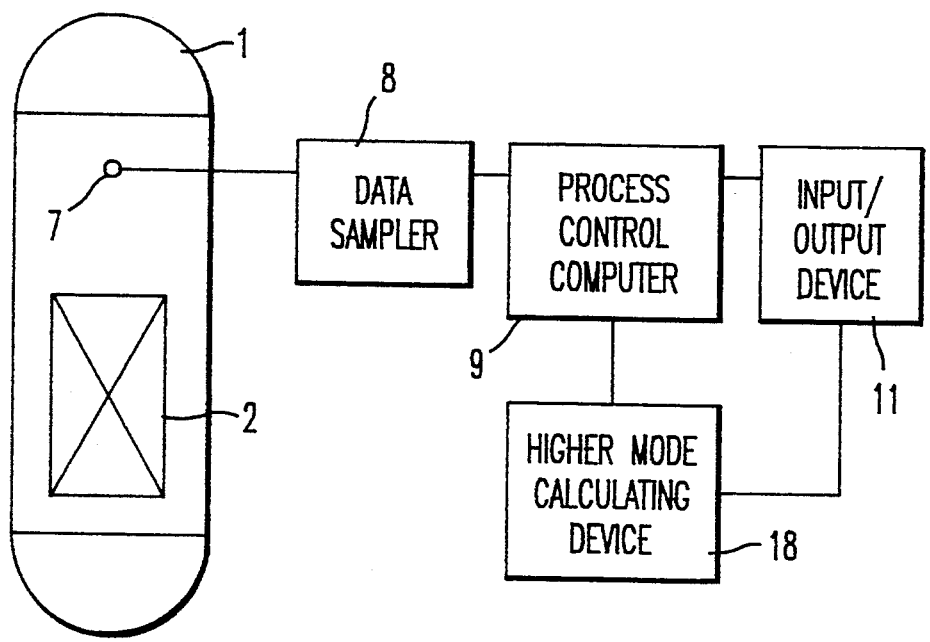
FIG. 15 is an overall structural view which illustrates a fourth embodiment of the system for monitoring power of a nuclear reactor according to the present invention.

FIG. 15 illustrates a fourth embodiment of a system for monitoring the power of a nuclear reactor. In this embodiment, a higher mode calculating device 18 is used in place of the subcriticality evaluation device 17 according to the second embodiment and the neutron flux detectors 5 are omitted.

The system for monitoring the power of a nuclear reactor according to this embodiment comprises the data sampler 8 which receives core present state data supplied from a core present data measuring device 7 as shown in FIG. 15, the data sampler 8 being arranged to supply the data, as core state data, to the process control computer 9 periodically or at a requirement made by the operator. The process control computer 9 calculates the neutron flux distribution (fundamental mode) in the reactor core 2 at the time of the execution of the SRI in accordance with core state data supplied from the data sampler 7 and the previously-registered control rod pattern at the time of the execution of the SRI as shown in FIG. 15. The results of the calculations are supplied to the higher mode calculating device 18.

The higher mode calculating device 18 calculates the higher mode of the neutron flux calculated by the process control computer 9 by solving Equation (2). The higher mode calculating device 18 notifies the results of the calculations to the operator by way of the input-/output device 11.

Figure 16:
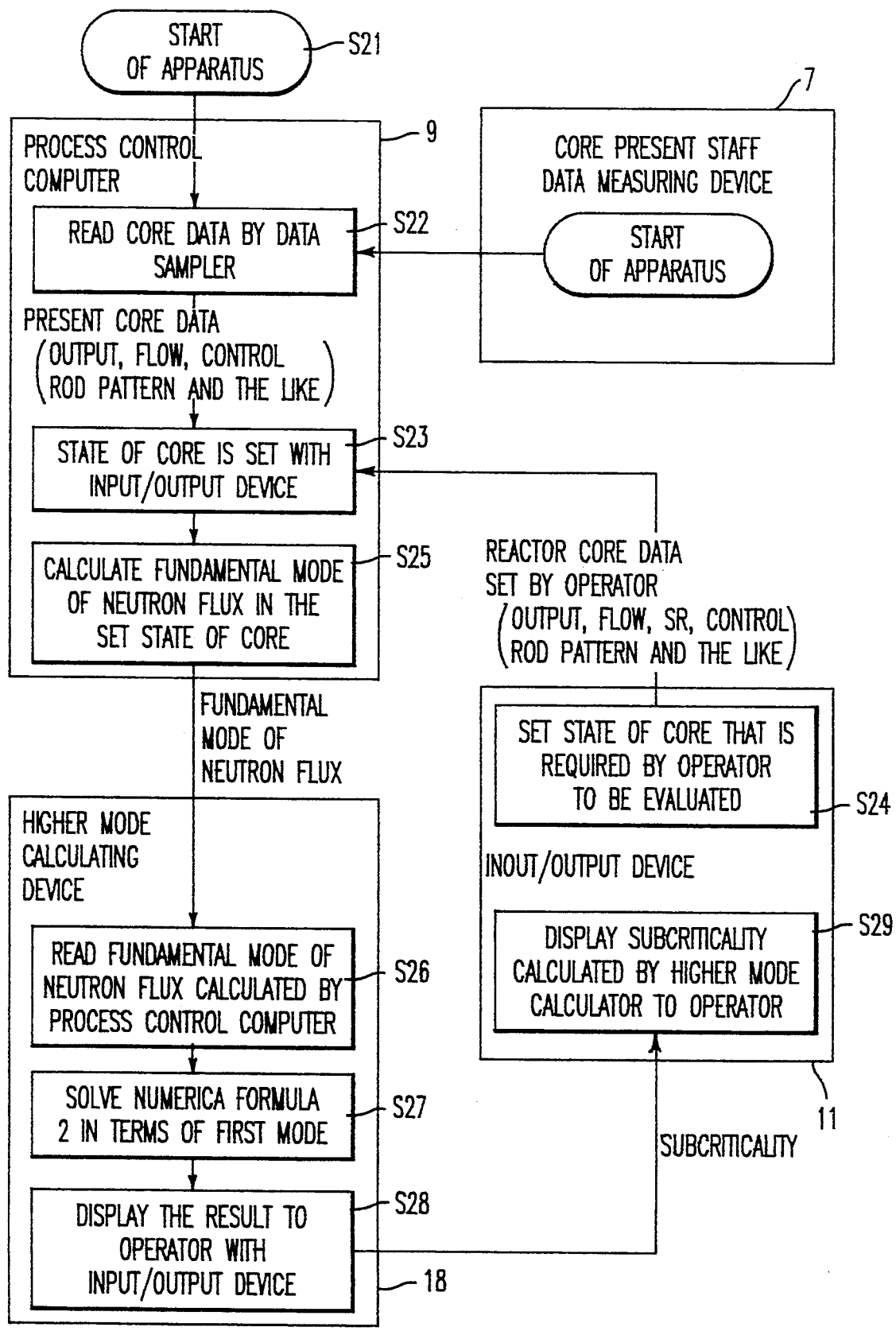
FIG. 16 is a flowchart which illustrates the flow of the process to be performed by the system for monitoring power of a nuclear reactor shown in FIG. 5.
Figure 17A:
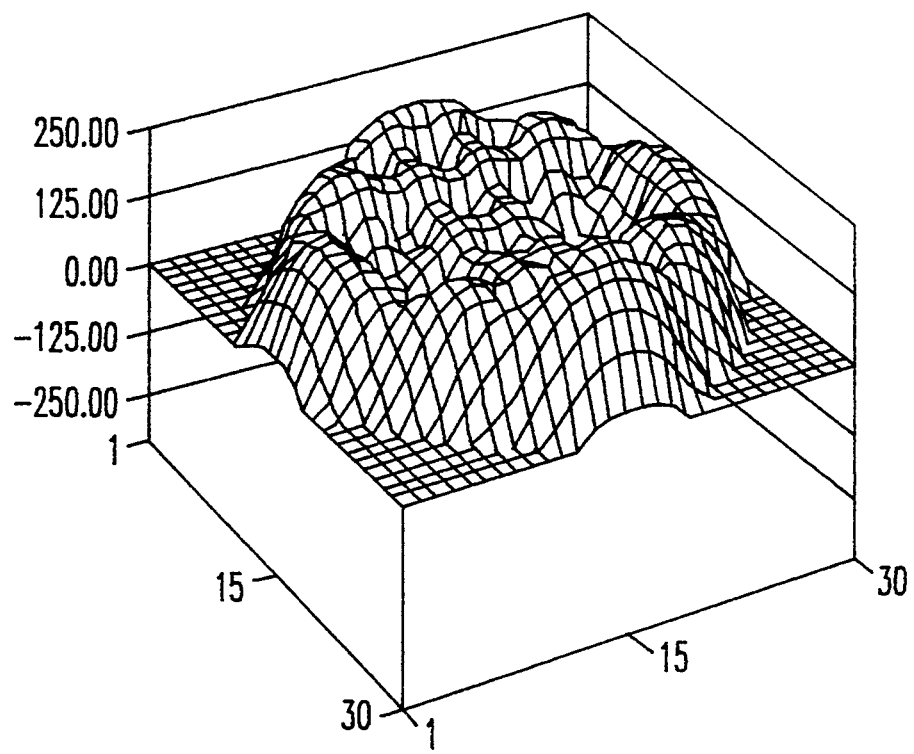
FIG. 17A is an explanatory view which illustrates the fundamental mode of the neutron flux in a state of the reactor core having a flat distribution and FIG. 17B is an explanatory view which illustrates the first mode of the neutron flux.
Figure 17B:
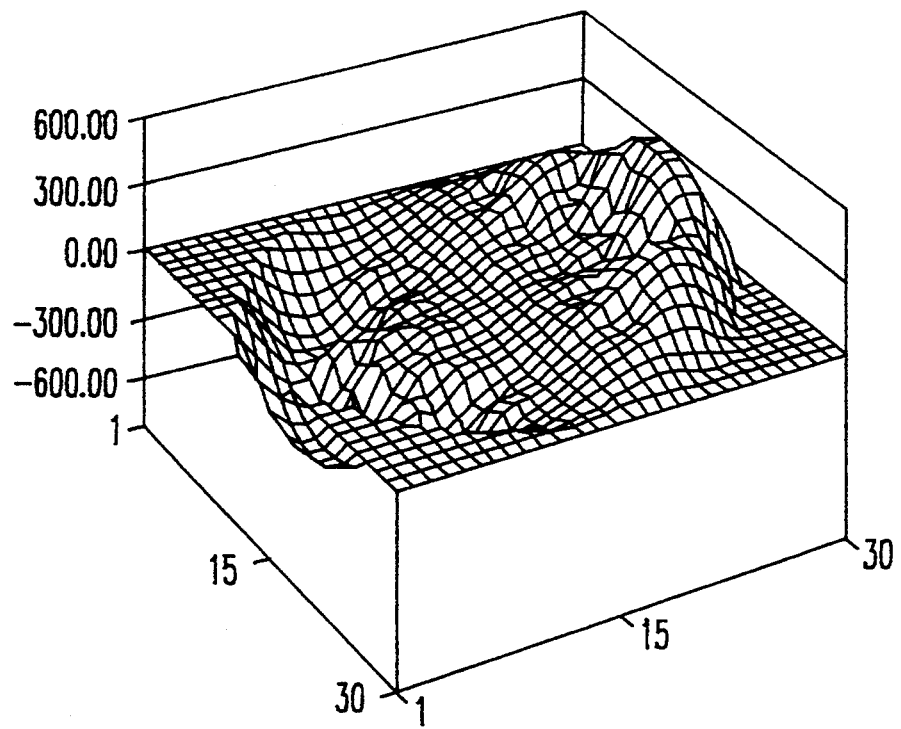
Figure 18A:
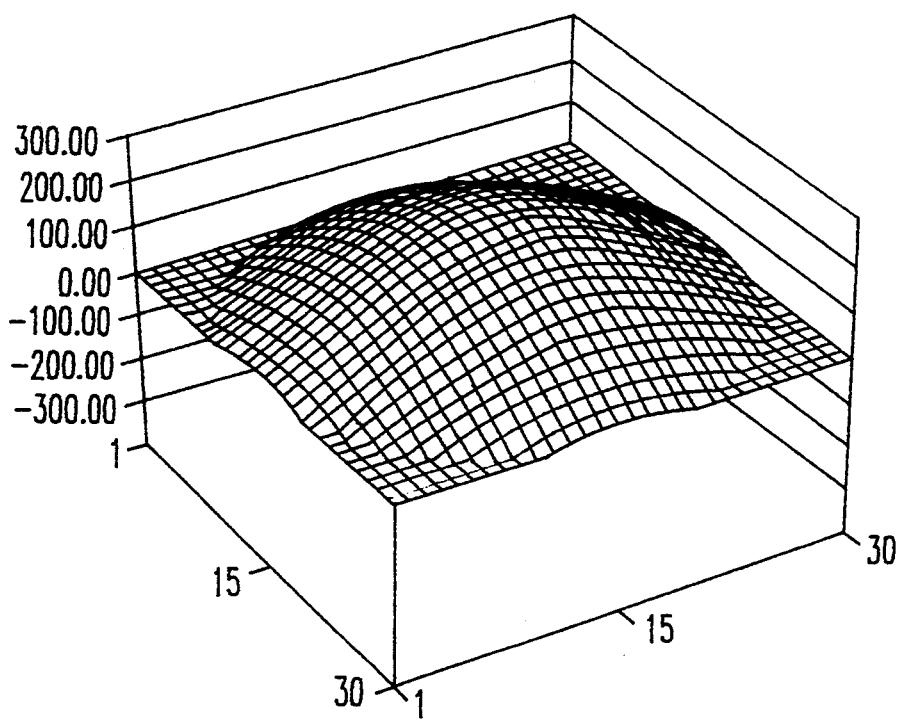
FIG. 18A is an explanatory view which illustrates the fundamental mode of the neutron flux in a state of the core having a non-flat distribution.
Figure 18B:
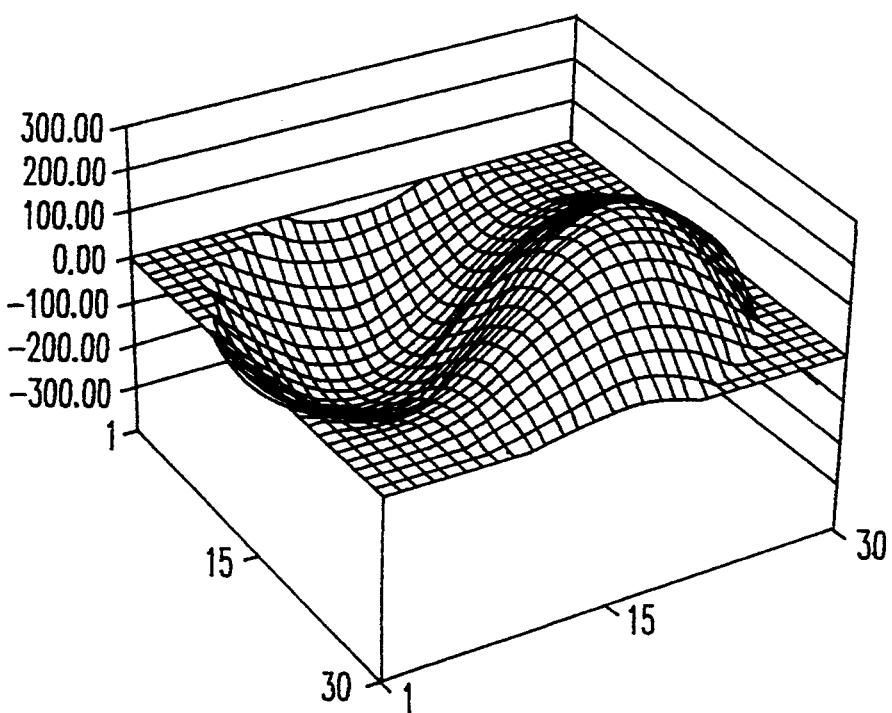
FIG. 18B is an explanatory view which illustrates the first mode of the neutron flux.

FIG. 16 shows a flow of the process to be performed by the system for monitoring the power of a nuclear reactor according to this embodiment.

When the system for monitoring the power of a nuclear reactor is started in step S21, the process control computer 9 reads the core state data supplied from the reactor core present state data measuring device 7 by way of the data sampler 8 in step 22. Further, the process control computer 9 sets the state of the core by way of the input/output device 11 in step S23. This setting is performed by setting, in step S24, the state of the core evaluated by the operator by making use of the input-/output device 11. Then, the basic mode of the neutron flux in the set state of the core is calculated in step S25.

On the other hand, the higher mode calculating device 18 reads the fundamental mode of the neutron flux calculated by the process control computer 9 in step S26. In next step S27, Equation (2) is solved in terms of the first mode of the neutron flux, and in next step S28, the results are displayed to the operator by way of the input/output device 11. As a result, the subcriticality calculated by the higher mode calculating device 14 is displayed on the input/output device 11 to be notified to the operator.

By evaluating the subcriticality of the higher mode of the neutron flux at the time of the initiation or operation of the SRI as described above, the possibility of the regional oscillations in the core condition can be notified to the operator. Therefore, the nuclear reactor can be operated at a reduced cost economically and efficiently.

Although the foregoing description about the embodiment comprises the process control computer that has a function as the neutron flux distribution calculating means, it may have the higher mode calculating means and the subcriticality evaluation means.

Figure 19:
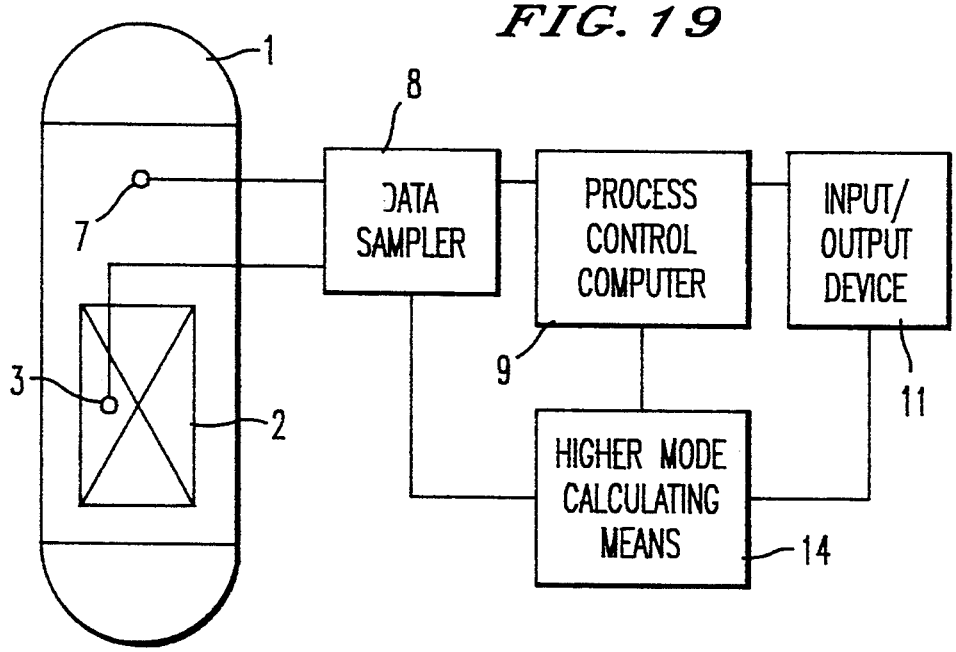
FIG. 19 is an overall structure of a fifth embodiment of a system for monitoring power of a nuclear reactor according to the present invention.

FIG. 19 shows a fifth embodiment of an apparatus for monitoring power of a nuclear reactor. Referring to FIG. 19, in the core 2 of the reactor 1, usually more than 100 LPRMs 3 are arranged. Further, arranged inside the reactor 1 is a core present state data measuring device 7 for measuring data of the core states such as the total flow rate of the coolant, the core-inlet/outlet temperatures of the coolant, and the control rod positions. The enumerated data on the LPRMs 3 and the measured data obtained by the core present state data measuring device 7 are sampled periodically by the data sampler 8, or upon request of the operator, and input to the process control computer 9 and a higher mode calculating device 14. The calculation results obtained by these calculators are outputted through an input/output device 11 and reported to the operator.

The process control computer 9 is initiated in synchronism with the data sampling by the data sampler 8 shown in FIG. 19, calculating the neutron flux distribution inside the core 2 at the time or state. This corresponds to the monitoring function, which is one of the functions of the process control computer 9, in which the neutron flux distribution inside the core 2 is calculated.

Apart from this monitoring function, the process control computer 9 has a predicting function. With this predicting function, the core condition as designated by the operator is calculated on the basis of the latest results obtained by the monitoring function, calculating the neutron flux distribution in this core condition. In this case, the process control computer 9 is initiated upon request of the operator.

The calculation results of the process control computer 9 are input to the higher mode calculating device 14, which is initiated in synchronism with the process control computer 9. By solving Equation (2), the the higher mode of the neutron flux calculated by the process control computer 9 is calculated. This calculation method is described, for example, in the publication as mentioned hereinbefore.

Further, the higher mode calculating device 14 is supplied with LPRM enumerated data from the data sampler 8 until there is a request from the operator, performing the following calculation:

[Formula 18]

$$\int_{all\ LPRM} S^M S_n C dv \qquad (18)$$

where

SM: LPRM enumerated data

SnC: LPRM data calculated from the neutron flux of n-th mode.

The calculation result of Equation (18) is, unlike that of equation (5'), to be regarded as a mode substitute value in that the LPRM measured data and the LPRM calculated data are used instead of the neutron flux itself.

As shown in FIG. 19, the calculation result of the higher mode calculating device 14 is inputted to the input/output device 8 along with the output from the process control computer 9. The input/output device 11 displays the result obtained by the monitoring function of the process control computer 9 and the calculation result of the higher mode calculating device 14 and, at the same time, is used to designate the core state in executing the predicting function of the process control computer 9.

Figure 20A:
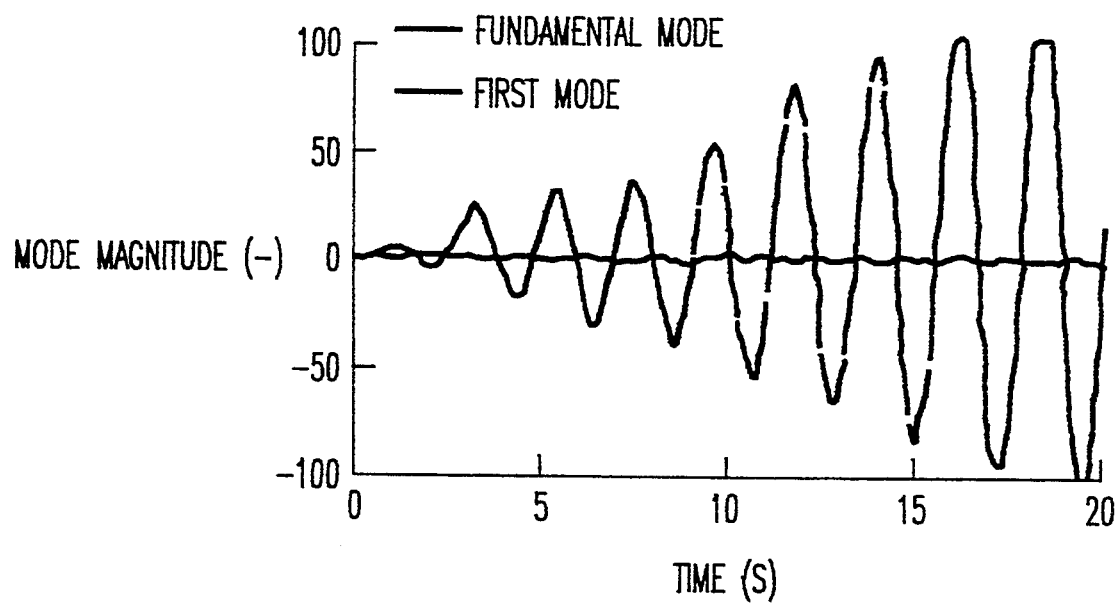
FIG. 20A is a graph related to the fifth embodiment as applied to a core-wide oscillation and FIG. 20B is a graph related to the fifth embodiment as applied to a regional oscillation.
Figure 20B:
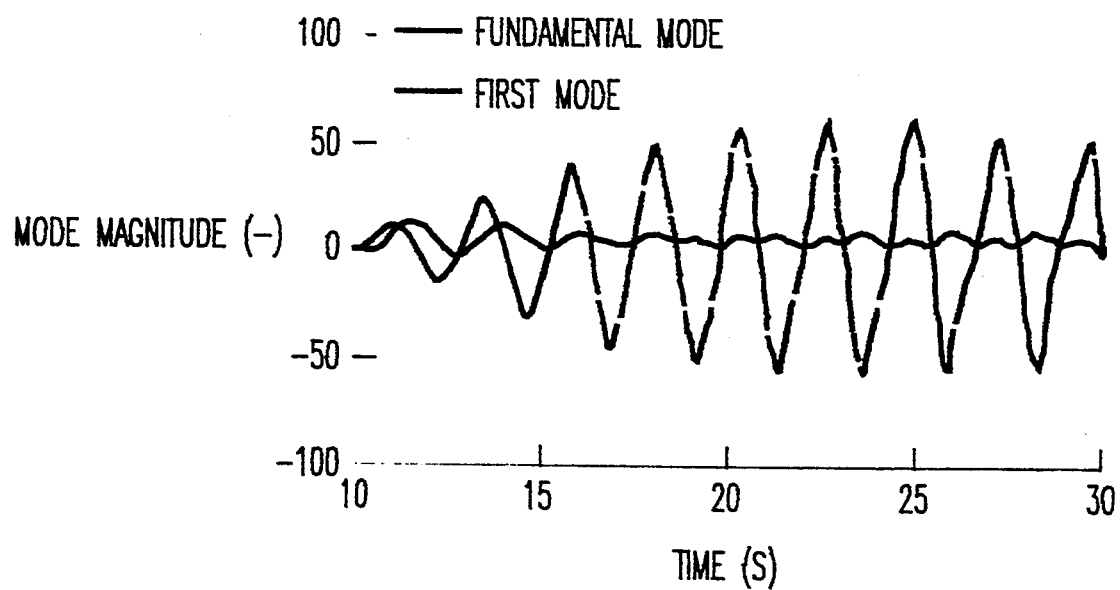
Figure 21A:
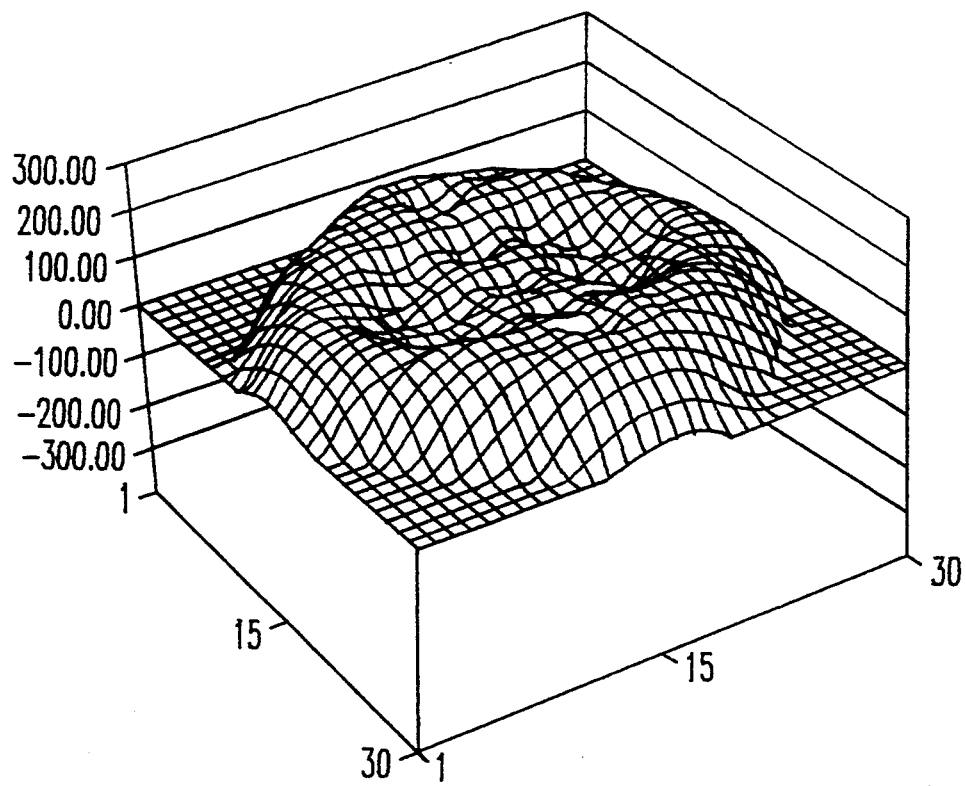
FIG. 21A is a diagram illustrating a fundamental mode of a neutron flux distribution inside the core.
Figure 21B:
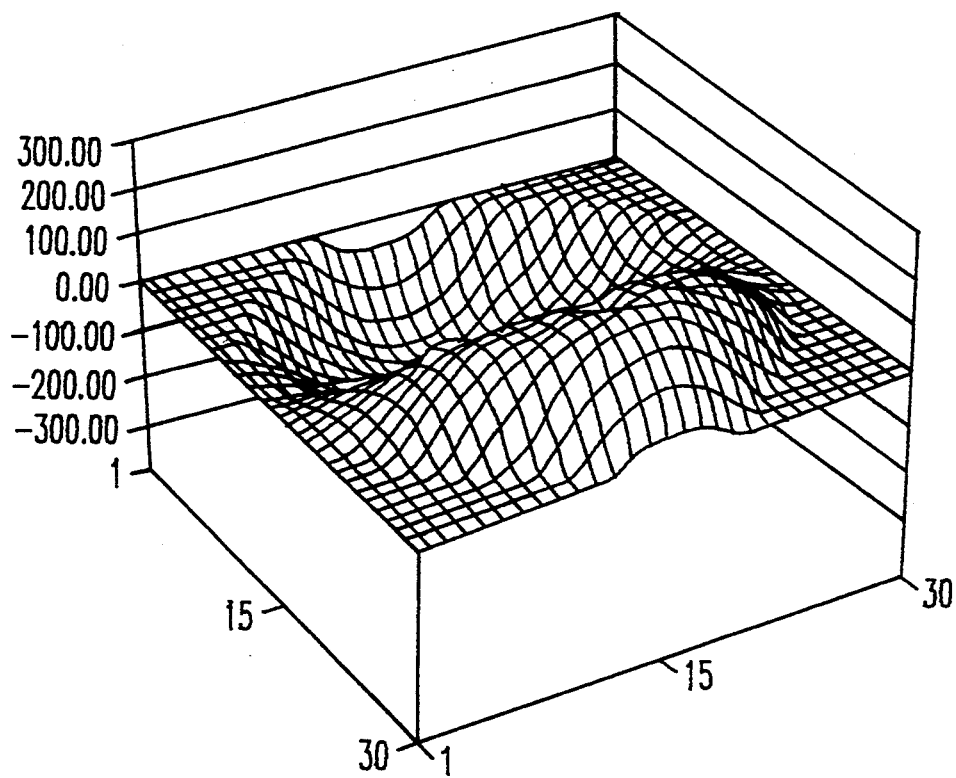
FIG. 21B is a similar diagram illustrating a first harmonic mode and FIG. 21C is a similar diagram illustrating a second harmonic mode, all relating to the fifth embodiment.
Figure 21C:
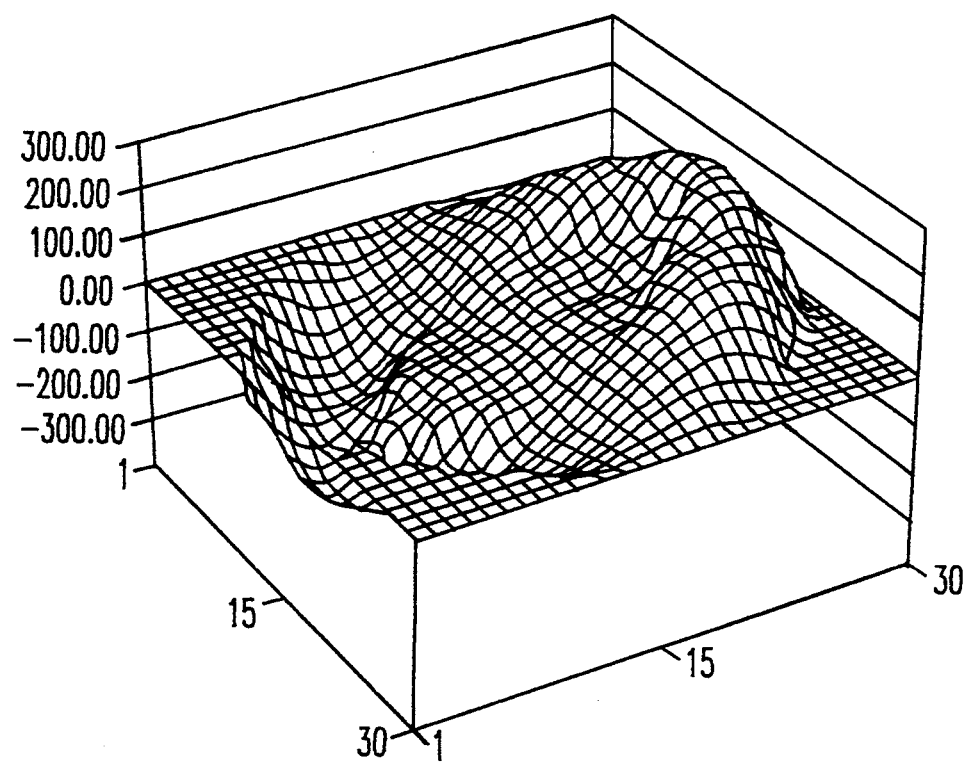

FIGS. 20A and 20B show the present invention as applied to a power output oscillation in the reactor of a 1,100,000 kwe class. FIG. 20A shows the case of a core-wide power oscillation, and FIG. 20B shows the case of a regional power oscillation.

As is apparent from FIGS. 20A and 20B, in the case of a core-wide oscillation, the magnitude of the fundamental mode oscillates greatly, but the magnitude of the first harmonics mode is almost constant. In contrast, when a regional power oscillation occurs, the magnitude of the first harmonics mode oscillates greatly, whereas the magnitude of the fundamental mode scarcely changes.

Thus, in accordance with this embodiment, a regional oscillation is coped with from the viewpoint of neutron higher modes, and the magnitude of each higher mode is indicated with respect to time, so that it is possible to quickly inform the operator of any regional oscillation, thereby enabling the reactor to be operated safely and efficiently.

As described above, the system for monitoring power of a nuclear reactor according to the present invention monitors the reactor power and the power distribution by using the respective neutron flux detection signal (LPRM signal) in such a manner that the filter calculating means obtains the filters (the filter coefficients W1 (t), W2 (2) and W3 (k, m) for extracting the characteristics of the signal change in response to the neutron flux detection signal. The filters thus-obtained are used to filter the respective neutron flux detection signals so that the decay ratio and the amplitude of the oscillations showing the operational state of the core and the amplitude showing the degree of the power change (oscillation) can be obtained. Therefore, the stability of the core can be monitored.

The apparatus for monitoring power of a nuclear reactor according to the present invention comprises the filter calculating means in addition to the conventional APRM signal obtained by averaging the analog signals to monitor the reactor power and the reactor power distribution by using each neutron flux detection signal. The filter calculating means obtains the filter corresponding to the state of the core or obtains the same corresponding to the change characteristics of the signal in response to each neutron flux detection signal, the filter for extracting the characteristics of the signal change being used to filter each neutron flux detection signal so that the decay ratio, the period of the oscillations and the amplitude showing the stability of the state of the core are obtained at the time of monitoring the stability of the core.

The calculation of the filter performed by a filter calculating means by a calculating step for periodically calculating the filter in accordance with the change of the spatial distribution characteristics of the reactor power whenever the operation condition is changed and by a sequential calculating step for calculating it in accordance with the amplitude difference or the phase difference between the signals. The former is calculated in accordance with information from the neutron flux distribution calculating means, which is a process control computer and that from a higher mode calculating means, while the latter is calculated in response to the neutron flux detection signal, which is an actually measured signal that is sequentially detected.

The power signal filtered by the filter calculated by the filter calculating means is received by the stability monitoring means to obtain sequentially the decay ratio and the oscillation period showing the stability of the reactor core and the amplitude showing the power change. The obtained values are used to monitor the stability of the reactor core to be evaluated in an on-line manner.

The system for monitoring power of a nuclear reactor is able to accurately detect the power change phenomenon, and, in particular, the power oscillation phenomenon due to the regional oscillations, which has been difficult to be detected by using the conventional APRM signal. Therefore, the apparatus is able to contribute to improve the stability of the reactor core and the availability of the nuclear reactor.

The system for monitoring power of a nuclear reactor according to the present invention is able to discriminate the possibility of the generation of the regional oscillations from the subcriticality of the state of the core obtained by the subcriticality evaluation means, to estimate the easiness of occurring the regional oscillations, to monitor the stability of the state of the core, to control the reactor core while preventing the generation of the regional oscillations and to operate the nuclear reactor safely and efficiently.

The system for monitoring power of a nuclear reactor according to the present invention calculates the higher mode of the neutron flux in a state of the core when the selected rod insertion (SRI) is initiated and discriminates whether or not its subcriticality is smaller than a predetermined limit value. Therefore, the possibility of the excitation of the regional oscillations at the time of the operation of the SRI can quickly be discriminated. Therefore, the nuclear reactor can be operated safely and efficiently.

What is claimed is:

1. A system for monitoring a power of a nuclear reactor in accordance with a change of a neutron flux distribution mode, comprising:
    a plurality of neutron flux measuring means disposed in a reactor core for measuring neutron flux and generating neutron flux signals;
    means for calculating a neutron flux distribution in the core in response to the neutron flux detection signals from the neutron flux measuring means;
    means for calculating a higher mode of the neutron flux distribution in accordance with the results of calculations performed by the neutron flux distribution calculating means;
    a filter calculating means for obtaining a filter for extracting characteristics of change of the neutron flux detection signal in accordance with a phase difference and an amplitude difference between neutron flux detection signals without cancelling; and
    an input/output means for transmitting the neutron flux detection signal filtered by the filter obtained by the filter calculating means.

2. A system according to claim 1, wherein said filter calculating means is operatively connected at one side to the neutron flux measuring means through a data sampler and at another side to the higher mode calculating means, and said filter calculating means obtains a filter reflecting a state of the core realized due to change of an operational state in accordance with the higher mode of the neutron flux distribution calculated by the higher mode calculating means and a filter obtained in accordance with differences in amplitudes and phases between signals occurring due to change of the neutron flux detection signal measured actually.

3. A system according to claim 1, further comprising a stability monitoring means connected to an output side of said filter calculating means, and wherein said stability monitoring means has a structure for evaluating a core stability index in response to a power signal filtered by the filter calculating means to monitor the stability of the state of the core.

4. A system according to claim 1, wherein said neutron flux distribution calculating means is constituted by a process control computing means which is provided in association with the higher mode calculating means.

5. A system according to claim 4, wherein said process control computing means includes the higher mode calculating means.

6. A system according to claim 4, further comprising a power distribution monitoring device connected at input side to the process control computing means and at output side to a display means.

7. A system for monitoring a power of a nuclear reactor in accordance with a change of a neutron flux distribution mode, comprising:
a plurality of neutron flux measuring means disposed in a reactor core for measuring neutron flux and generating neutron flux signals;
means for calculating a fundamental mode distribution of the neutron flux in response to the neutron flux detection signals from the neutron flux measuring means;
a subcriticality evaluating means for estimating a subcriticality of a state of the core in accordance with the neutron flux distribution in the calculated fundamental mode and in comparison to a value as a primary moment of the power distribution with respect to a distance with a predetermined value; and
an input/output means for transmitting a result of an evaluation made by the subcriticality evaluation means.

8. A system according to claim 7, further comprising a higher mode calculating means for calculating a higher mode of the neutron flux distribution in accordance with results of calculations performed by the neutron flux distribution calculating means and a filter calculating means for obtaining a filter for extracting characteristics of change of the neutron flux detection signal in accordance with the neutron flux detection signal, and wherein results of calculations performed by said filter calculating means is transmitted to the input/output means.

9. A system according to claim 7, wherein said neutron flux distribution calculating means is constructed by a process control computing means connected at input side to the neutron flux measuring means through a data sampler and at output side to the subcriticality evaluation means.

10. A system according to claim 9, wherein said process control computing means is further connected at output side to the high mode calculating means.

11. A system according to claim 10, further comprising a filter calculating means operatively connected to the neutron flux measuring means for obtaining a filter for extracting characteristics of change of the neutron flux detection signal in response to the neutron flux detection signal and a stability monitoring means connected to an output side of said filter calculating means, and wherein said stability monitoring means has a structure for evaluating a core stability index in response to a power signal filtered by the filter calculating means to monitor the stability of the state of the core.

12. A system for monitoring power of a nuclear reactor in accordance with a change of a neutron flux distribution mode, comprising:
a core present state data measuring means for measuring an operational state of a core of the nuclear reactor and generating a core operational state signal;
means for calculating a neutron flux distribution in a fundamental mode in response to the core operational state signal;
means for calculating a higher mode of the neutron flux in a state of the core realized when insertion of a selected control rod is initiated in accordance with the calculated neutron flux distribution and discriminating whether or not a subcriticality of the higher mode is smaller than a predetermined limit value; and
an input/output means for transmitting results of calculations performed by the higher mode calculating means.

13. A system for monitoring power of a nuclear reactor in accordance with the change of the neutron flux distribution mode, comprising:
a plurality of neutron flux measuring means disposed in a core of the reactor for measuring neutron flux in the core and generating a signal representing a local power range monitor measured data from the neutron flux measuring means;
means for calculating neutron flux distribution in response to the signal from the neutron flux measuring means;
a higher mode calculating means for calculating neutron higher modes in accordance with the calculation results of the neutron flux distribution calculating means; and
an input/output means for outputting calculation results from the neutron flux distribution calculating means and the higher mode calculating means.

14. A system according to claim 13, wherein said higher mode calculating means is provided with a magnitude variation calculating means for calculating a variation in magnitude in each mode on the basis of the higher mode modes and the local power range monitor measured data.

15. A system according to claim 13, wherein said neutron flux distribution calculating means is constructed by a process control computing means operatively connected at input side to the neutron flux measuring means through a data sampler and at output side to the higher mode calculating means.

* * * * *